(12) United States Patent
Hughes et al.

(10) Patent No.: US 7,791,607 B1
(45) Date of Patent: *Sep. 7, 2010

(54) SYSTEMS AND METHODS FOR INTEGRATING GRAPHIC ANIMATION TECHNOLOGIES IN FANTASY SPORTS CONTEST APPLICATIONS

(75) Inventors: Patrick J Hughes, Vienna, VA (US); David Barber, Tulsa, OK (US)

(73) Assignee: Rovi Technologies Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/485,714

(22) Filed: Jun. 16, 2009

Related U.S. Application Data

(63) Continuation of application No. 10/234,906, filed on Aug. 30, 2002, now Pat. No. 7,548,242.

(51) Int. Cl.
*G06T 15/70* (2006.01)
(52) U.S. Cl. ............... 345/473; 345/419; 348/584; 463/4; 463/20; 463/29; 463/31; 463/40; 463/42; 700/91; 700/92; 700/93; 700/218
(58) Field of Classification Search ............... 345/473, 345/419; 463/4, 20, 29, 31, 40, 42; 700/91, 700/92, 93, 218
See application file for complete search history.

(56) References Cited

U.S. PATENT DOCUMENTS

| 4,918,603 A | 4/1990 | Hughes et al. |
| 5,018,736 A | 5/1991 | Pearson et al. |
| 5,263,723 A | 11/1993 | Pearson et al. |

(Continued)

FOREIGN PATENT DOCUMENTS

| WO | WO 01/33482 | 5/2001 |

(Continued)

OTHER PUBLICATIONS

Cliff Charpentier, "1984 Fantasy Football Digest," Fantasy Sports Inc., Jun. 1984.

(Continued)

*Primary Examiner*—Kimbinh T Nguyen
(74) *Attorney, Agent, or Firm*—Ropes & Gray LLP

(57) ABSTRACT

Systems and methods for integrating graphic animation technologies with fantasy sports contest applications are provided. This invention enables a fantasy sports contest application to depict plays in various sporting events using graphic animation. The fantasy sports contest application may combine graphical representation of real-life elements such as, for example, player facial features, with default elements such as, for example, a generic player body, to create realistic graphic video. The fantasy sports contest application may provide links to animated videos for depicting plays on contest screens in which information associated with the plays may be displayed. The fantasy sports contest application may play the animated video for a user in response to the user selecting such a link. In some embodiment of the present invention, the fantasy sports contest application may also customize animated video based on user-supplied setup information. For example, the fantasy sports contest application may provide play information and other related data to allow a user to generate animated videos using the user's own graphics processing equipment and graphics animation program.

20 Claims, 16 Drawing Sheets

U.S. PATENT DOCUMENTS

| | | | |
|---|---|---|---|
| 5,772,512 | A | 6/1998 | Chichester |
| 5,846,132 | A | 12/1998 | Junkin |
| 5,860,862 | A | 1/1999 | Junkin |
| 5,971,854 | A | 10/1999 | Pearson et al. |
| 6,193,610 | B1 | 2/2001 | Junkin |
| 6,319,123 | B1 | 11/2001 | Paludi |
| 6,371,855 | B1 | 4/2002 | Gavriloff |
| 6,745,236 | B1 | 6/2004 | Hawkins et al. |
| 6,750,919 | B1* | 6/2004 | Rosser ........................ 348/584 |
| 6,837,789 | B2 | 1/2005 | Garahi et al. |
| 6,837,791 | B1 | 1/2005 | McNutt et al. |
| 7,001,279 | B1 | 2/2006 | Barber et al. |
| 2001/0036853 | A1 | 11/2001 | Thomas |
| 2004/0117831 | A1 | 6/2004 | Ellis et al. |
| 2006/0148569 | A1* | 7/2006 | Beck ........................... 463/43 |
| 2006/0253868 | A1* | 11/2006 | Ludvig et al. ................. 725/50 |

FOREIGN PATENT DOCUMENTS

| | | |
|---|---|---|
| WO | WO 03/015403 | 2/2003 |

OTHER PUBLICATIONS

Jim Donaldson, "The Official Fantasy Football League Manual," Contemporary Books, Inc., 1985.

Cliff Charpentier, "1985 Fantasy Football Digest," Lerner Publications Company, 1985.

"All Pro Yearbook 1987: The Fantasy Football Magazine," All Pro Publishing Company, 1987.

BBC Sport, *Fantasy Football Monthly, The Game* <http://bbcfootball.fantasyleague.co.uk/> (accessed Sep. 17, 2002).

CNN Sports Illustrated, *Fantasy Football Challenge* <http://footballl2201.si.cnn.com/et al.> (accessed Sep. 23, 2002*).

CNN Sports Illustrated, *Fantasy Golf Challenge* <http://gold5.si.cnn.com/ et al.> (accessed Sep. 23, 2002*).

CNN Sports Illustrated, *Fantasy Nascar Challenge* <http://racing20.si.cnn.com/ et al.> (accessed Sep. 23, 2002*).

CBS SportsLine.com, *John B. Sample League* <http://cbs.sportsline.com/> (accessed Nov. 24, 1999).

CBS SportsLine.com, *Fantasy Baseball* <http://baseball101.fantasy.sportsline.com/ et al.> (accessed Sep. 23-24, 2002*).

CBS SportsLine.com, *Fantasy Football* <http://football2145.fantasy.sportsline.com et al.> (accessed Sep. 23-24, 2002).

CBS SportsLine.com, *Fantasy Golf* <http://golf1.fantasy.sportsline.com/ et al.> (accessed Sep. 23, 2002*).

CBS SportsLine.com, *Fantasy Hockey* <http://hockey2102.fantasy.sportsline.com/ et al.> (accessed Sep. 23-24, 2002).

CBS SportsLine.com, *Fantasy Racing* <http://racing.fantasy.sportsline.com/ et al.> (accessed Sep. 23, 2002*).

ESPN Internet Ventures, *ESPN Fantasy Games* <http://games.espn.go.com/cgi/home/request.dll?FRONTPAGE et al.> (accessed Sep. 16-18, 2002*).

* cited by examiner

SYSTEMS AND METHODS FOR INTEGRATING GRAPHIC ANIMATION TECHNOLOGIES IN FANTASY SPORTS CONTEST APPLICATIONS

CROSS-REFERENCE TO RELATED APPLICATIONS

This application is a continuation of U.S. patent application Ser. No. 10/234,906 filed Aug. 30, 2002, now U.S. Pat. No. 7,548,242, which is hereby incorporated by reference herein in its entirety.

BACKGROUND OF THE INVENTION

This invention relates to fantasy sports systems and methods and, more particularly, this invention relates to ways in which graphic animation technologies may be integrated with fantasy sports contest applications.

Athletic endeavors have long supported a broad range of secondary competitions, which include wagering on the outcome of particular games and wagering on the performance of a particular player.

In known fantasy sports contests, a user selects a roster, a team, a particular individual, or a group of individuals in an athletic contest. The user is given the ability to take on the role of a fictional general manager with powers which may include the ability to draft, trade, dismiss and otherwise manage the player or players on the user's fantasy sports team.

Conventionally, either a fantasy sports contest provider or a league commissioner sets the rules under which a group of fantasy sports users compete against each other in a fantasy sports contest. For example, for every goal scored in real-life by a member of the user's fantasy soccer team, five points may be awarded to the user in the fantasy sports contest.

The real-life athletic events upon which a fantasy sports contest may be based are varied, and typically involve selecting players from real-life team sports (e.g., football, baseball, basketball, hockey, soccer or rugby), selecting players from real-life individual sports (e.g., golf, tennis or automotive racing), or selecting participants from competitions involving animals (e.g., horse and dog racing). The user's selections are typically stored in the user's fantasy sports contest roster. The performance of these selections in real-life competitions collectively determine the user's performance in the fantasy sports contest.

Current fantasy sports contests application typically focus on providing users with non-graphical information (e.g., descriptions, statistics, etc.) about sporting events that may be useful or interesting to the user in fantasy sports contests. While such non-graphical information may communicate important information associated with these sporting events to the user, such information does not communicate any exciting visual plays in these events that are also very important to the user.

Accordingly, it is desirable to present improved ways for providing animated videos for depicting plays in various sporting events to the user.

SUMMARY OF THE INVENTION

It is therefore an object of the present invention to provide improved ways for providing animated videos for depicting plays in various sporting events to the user.

This and other objects of the invention are accomplished in accordance with the principles of the present invention by integrating graphic animation technologies in fantasy sports contest applications.

The fantasy sports contest application may provide animated videos to visually depict plays that have taken place in various sporting events such as football games, basketball games, golf tournaments, tennis tournaments, horse races, or any other event suitable for supporting a fantasy sports contest. Plays that may be depicted in these sporting events may include, for example, a touchdown, a slam-dunk, a putt, a serve, a pass, or any other play that may be of interest to the user.

Animated videos may be any suitable video for visually communicating a play that have taken place in a sporting event. Animated video may be, for example, moving graphics (e.g., stick figures, body outlines, images of real-life elements, etc.), cartoons, computer-generated videos, conventional video of real-life events, or any other suitable video.

In some embodiments of the present invention, the fantasy sports contest application may create animated video using realistic graphical representation of real-life elements, for example, player facial features, stadium layouts, team uniforms, or any other suitable element that may be depicted based on a real-life element. In other embodiments of the present invention, the fantasy sports contest application may provide animated video generated using default graphical elements such as default player physiques that may assume features of various body types, default uniforms that may change in color to represent various teams, or any other suitable default graphical element.

In some embodiments of the present invention, the fantasy sports contest application may associate animated video for depicting plays in sporting events with various fantasy sports contest information provided in connection with those sporting events (e.g., statistical information). As an example, the fantasy sports contest application may display a description of a touchdown pass in a football game that has resulted in six points for the user with an associated animated video link. When the user selects the link, the fantasy sports contest application may provide the user with one or more animated videos for depicting the pass. The one or more animated videos may depict the pass, for example, from different angles, focusing on various players (e.g., one animated video may focus on the thrower while another may focus on the receiver), from various distances, or according to any other suitable specification.

As another example, a statistics page displaying, for example, statistics associated with an athlete on the user's fantasy sports basketball team, may have links associated with various statistics (e.g., assists, steals, blocks, 3 point shots, etc.). The fantasy sports contest application may provide the user with one or more animated videos for depicting plays made by the athlete that have resulted in a particular statistic when the link associated with that statistic is selected (e.g., the fantasy sports contest application may provide three animated videos in association with a steal statistic of 3).

In some embodiments of the present invention, the fantasy sports contest application may provide animated videos to depict various plays in various sporting events based on user-supplied animated video setup information. Animated video setup information may be, for example, user graphics animation program information, user graphics processing equipment information, user request information for pre-generated animated videos, or any other suitable information. In response to receiving the animated video setup information from the user, the fantasy sports contest application may store the information in association with the user at a suitable location (e.g., a database).

As an example, the user may request during animated video setup to be allowed to generate animated videos using the user's own graphics processing equipment (e.g., a video game system) and graphics animation programs (e.g., video game programs). Such an arrangement may significantly reduce the bandwidth requirement that is normally associated with downloading video onto the user equipment. In response to this request, the fantasy sports contest application may provide the user with suitable information for instructing the user's specific equipment to generate any desired animated video.

In some of embodiments of the present invention, the fantasy sports contest application may create various versions of play information to describe the same play in a particular sporting event. Each version of play information may be interpreted by one or more types of user graphics processing equipment to generate animated video on user equipment. The fantasy sports contest application may provide an appropriate version of play information to the user based on various selection criteria. For example, based on the processing power of the user's graphics processing equipment, the fantasy sports contest application may select an appropriate version of play information for instructing the user's graphics processing equipment to generate animated video.

In some embodiments of the present invention, the fantasy sports contest application may provide a standard version of play information to the user equipment for instructing the user equipment to generate animated video. Additional components such as a translator (e.g., API, software kernel, module, or any other suitable component) may be downloaded or purchased by the user for translating the standard version of play information into information compatible with the user's particular equipment.

In some embodiments of the present invention, the fantasy sports contest application may allow the user to create a play based on a particular real-life play using user equipment. First, the fantasy sports contest application may generate an initial scene based on the real-life play. The initial scene may be, for example, an animated video frame that depicts a particular scene in the real-life play. Upon displaying the initial scene to the user, the fantasy sports contest application may allow the user to control the progression of events following the initial scene. For example, the fantasy sports contest application may allow the user to control a particular athlete involved in the real-life play similar to the way that the user may be allowed to control a character in a convention video game system.

As an example, the user may be allowed to control a soccer player that attempts a goal in a real-life play in a soccer game. The user may control the progression of events by instructing the player to shoot at the upper right hand corner of the goal instead of shooting at the lower left hand corner of the goal as according to the real-life event. The fantasy sports contest application may generate the progression of events produced under the user's control and may then display the progression to the user. In some embodiments of the present invention, the fantasy sports contest application may provide additional information such as information for instructing the user equipment to generate the progression of event based on the user's instructions.

In some embodiments of the present invention, the fantasy sports contest application may allow the user to choose during animated video setup to be provided with pre-generated animated videos that require no additional processing on the user equipment. In these embodiments, the fantasy sports contest application may generate animated videos using graphics processing equipment located at a remote location and provide the animated videos as, for example, streaming videos, to the user equipment. In some embodiments of the present invention, the fantasy sports contest application my provide pre-generated animated videos to user equipment automatically as a default feature. The fantasy sports contest application may allow the user to change this default feature through animated video setup.

Further features of the invention, its nature and various advantages will be made apparent from the accompanying drawings and the following detailed description.

DETAILED DESCRIPTION OF THE INVENTION

Figure 1:
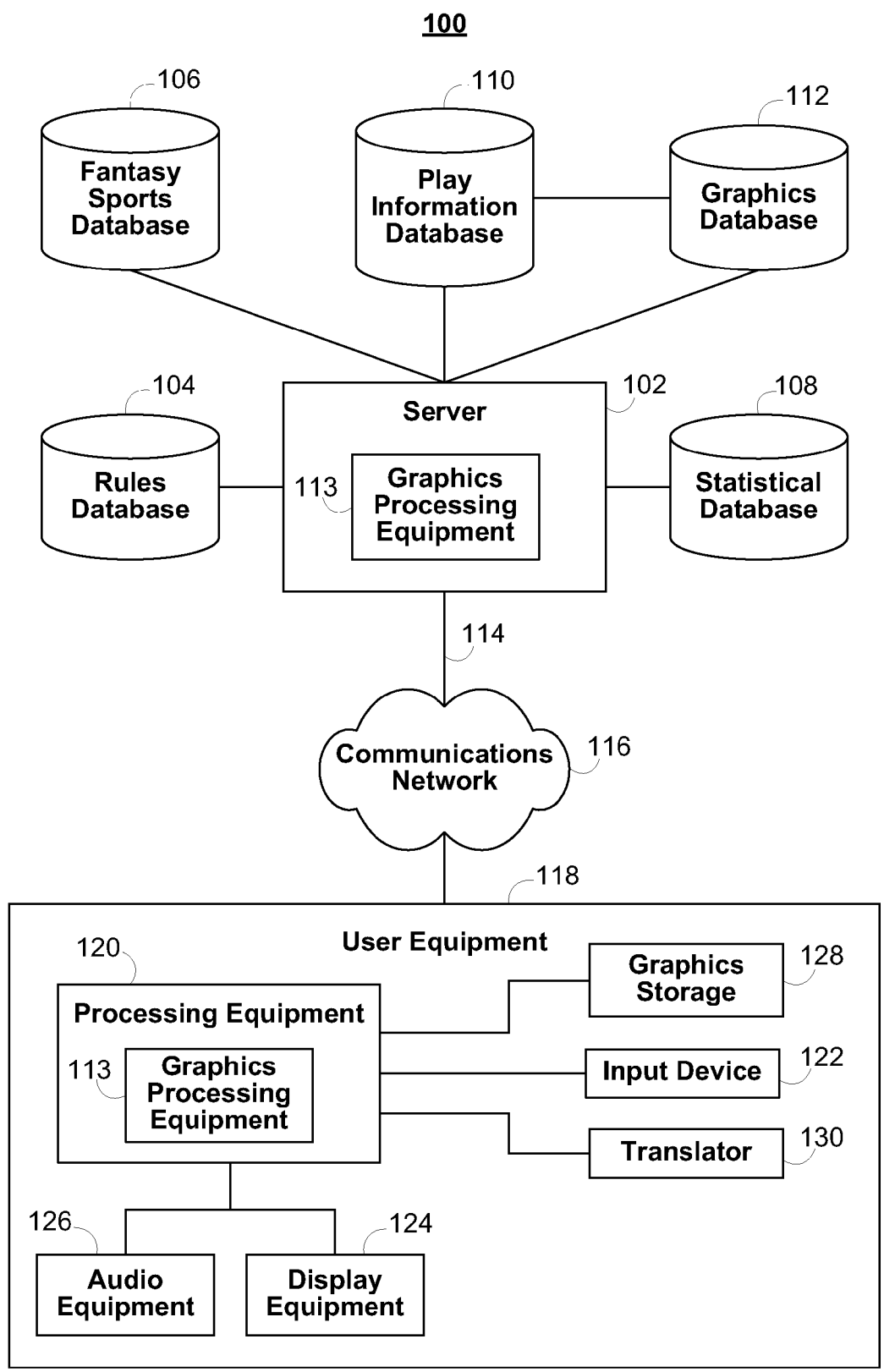
FIG. 1 is a schematic diagram of an illustrative client/server system in accordance with one embodiment of the present invention.

The fantasy sports contests of the present invention may include any suitable sports contest in which the user is given the ability to make decisions that may affect the standing of the user in the sports contest. For example, in typical team-oriented fantasy sports contests, the user may participate in the capacity of a general manager. In this situation, the user may be have responsibilities such as creating a team roster (e.g., drafting players), selecting player positions, selecting starters, selecting relievers, making trades, and otherwise maintaining the composition of the user's team roster. It will be understood that any other suitable decision-making capability may be given to the user in a fantasy sports contest in addition to or in place of those indicated above.

The fantasy sports contest of the present invention need not be limited or restricted in time. For example, a fantasy sports contest may last an entire season, a portion of the season, a definite period of time (e.g., one month, two weeks, three days, one hour, etc.), the duration of a particular event (e.g., Wimbledon, etc.), a portion of a particular event, or any other suitable period of time.

In one suitable approach, fantasy sports contests may include contests in which the user is not necessarily playing the role of a general manager. For example, fantasy sports contests may involve the user determining or guessing (i.e., blindly or with calculation) whether particular outcomes will occur (e.g., whether a particular golfer will make the next put). Any such suitable decision-making may be the basis of a fantasy sports contest or a part of a fantasy sports contest.

The fantasy sports contests of the present invention may use any suitable one or more scoring systems. For example, existing fantasy scoring systems include straight point systems (e.g., points are awarded and subtracted based on real-life plays without regard to the performance of other players on other fantasy teams in a league), rotisserie systems (e.g., points are awarded based on the user's relative ranking against other users), head-to-head systems (e.g., users in a league are matched against one another in a round-robin series of one-on-one contests during the course of a season). These are merely illustrative scoring systems. Any other suitable scoring system may be used in the fantasy sports contests of the present invention.

It will be understood that the above are merely illustrative elements of fantasy sports contests. Any other suitable arrangement or approach may be used. It will further be understood that the nature of the fantasy sports contests may vary depending on which activity or sport is involved or based on any other suitable criteria.

The fantasy sports contest application of the present invention may provide to the user fantasy sports contest information. Fantasy sports contest information may include any suitable information associated with one or more fantasy sports contests in which the user participates or in which the user may have an interest. For example, fantasy sports contest information may include information regarding the user's one or more rosters, the user's standing in one or more fantasy sports contests, point tallies associated with the user in one or more fantasy sports contests, information regarding the number of trades that the user may make, information regarding the amount of fantasy money available to the user for contracting players for a roster, information regarding deadlines to make trades or to perform any other suitable task associated with one or more fantasy sports contests, or any other suitable information.

Fantasy sports contest information may also include information regarding real-life athletes (e.g., names, statistics, etc.), real-life sports leagues (e.g., game schedules, standings, etc.), real-life sporting events (e.g., baseball games, golf tournaments, tennis matches, etc.), sports arenas, weather information, sports commentary, or any other suitable information regarding real-life sports or events that may have an affect on the one or more fantasy sports contests in which the user participates.

The present invention is primarily described herein in terms of the fantasy sports contest application. It will be understood that any other suitable software, hardware, or both may be used in conjunction with the fantasy sports contest application to implement some or all of the present invention.

FIG. 1 shows an illustrative client/server-based fantasy sports contest system 100 in accordance with one embodiment of the present invention. A fantasy sports contest application may be entirely or partially implemented using system 100. Sever 102 may access one or more databases including information related to fantasy sports contests, for example, rules database 104, fantasy sports contest database 106, statistical database 108, play information database 110, graphics database 112, or any other suitable database.

Rules database 104 may be used to store rules for one or more fantasy sports contests. Statistical database 108 may include real-life statistical information on athletes in one or more real-life sports categories (e.g., baseball, basketball, football, etc.). fantasy sports contest database 106 may store any other types of data used in conjunction with the operation of one or more particular fantasy sports contests (e.g., game time, game duration, etc.).

Play information database 110 may include various versions of play information. Play information may include descriptions of real-life plays in one or more sports categories such as, for example, descriptions of a touchdown in a football game, a slam dunk in a basketball game, a home run in a baseball game, or any other suitable play that the user may be interested in seeing visually depicted. Description of a play may include detailed information specific to that play such as, for example, the type of sport (e.g., football, baseball, basketball, rugby, etc.), the players involved (e.g., player names), the play type (e.g., touchdown, slam dunk, home run, etc.), the play location (e.g., name of stadium), the outcome of the play (e.g., lost the ball), the starting location, the ending location, or any other information specific to a particular play. In some embodiments of the present invention, a few versions of play information may be stored for a single play, whereby each version may be compatible with one or more types of graphics processing equipment that is capable of generating animated video based on the play information.

Graphics database 112 may include various sports-related graphics, audio, and graphics animation programs that may be used to depict real-life plays in various sports categories. Stored graphics may include, for example, images of sports stadiums and arenas (e.g., Madison Square Garden, Soldiers Stadium, Camden Yards, etc.), images of players (e.g., Michael Jordan, Jerry Rice, Tiger Woods, etc.), images of uniforms (e.g., New York Yankee's home and away uniforms, cheerleader uniforms, historical team uniforms, etc.), or any other suitable graphics or graphics-related details (e.g., color, texture, etc.) for generating realistic animated videos. Graphics animation programs may be any software programs suitable for manipulating and constructing the graphics and audio into animated videos.

In some embodiments of the present invention, server 102 may include graphics processing equipment 113, which may be any combination of hardware and software capable of interpreting play information (e.g., from play information database 110 or any other suitable location) and generating animated audio based on the play information using graphics, audio, and graphics animation programs available to it (e.g., provided by graphics database 112). Animated videos generated by graphics processing equipment 113 may be optimized as streaming videos and communicated to user equipment with other fantasy sports contest information.

Communications network 116 may be used for communication between users having user equipment 118 and server 102. Multiple communications network 116 and multiple user equipment 118 may be desired, although only one of each is shown to avoid over-complicating the drawing. User equipment 118 may include processing equipment 120 for receiving and transmitting fantasy sports contest data. The user may interact with processing equipment 120 using input device 122. Input device 122 may be, for example, a remote control, a keyboard, a voice-recognition device, a track ball, a mouse, or any other suitable device.

Animated video (e.g., streaming video) and other fantasy sports contest data received by processing equipment 120 may be displayed for the user on display equipment 124. Display equipment 124 may be, for example, a television, a monitor, or any other suitable display equipment. Audio information generated by processing equipment 120 may be played for the user using audio equipment 126 (e.g., speakers). Audio equipment 126 may be stand-alone equipment or integrated with display equipment 124.

In some embodiments of the present invention, user equipment 118 may generate animated video to depict plays based on play information received from server 102 over communications network 116. In these embodiments, user equipment 118 may have graphics processing equipment 113, graphics storage 128, and translator 130, if translation of play information is necessary, for processing play information and generating animated video based on the play information. Graphics processing equipment 113 may be any suitable combination of hardware and software for executing graphics animation programs to generate animated video. Graphics processing equipment 113 may be stand-alone equipment (e.g., a video game system) or integrated into processing equipment 120. Graphics animation programs for execution may be stored in graphics storage 128 which may be accessed by graphics processing equipment 113. Graphics storage 128 may also include sports-related audio and graphics that may include, for example, images of sports stadiums (e.g., Madison Square Garden, Soldiers Stadium, Camden Yards, etc.), images of players (e.g., Michael Jordan, Jerry Rice, Tiger Woods, etc.), images of uniforms (e.g., New York Yankee's home and away uniforms, cheerleader uniforms, historical team uniforms, etc.), or any other suitable graphics or graphics-related details (e.g., color, texture, etc.) for generating realistic animated videos.

In some embodiments of the present invention, graphics storage 128 may store graphics, audio, graphics animation programs, and other data communicated from servers 102 for the purpose of depicting plays. In other embodiments, graphics storage may be a detachable unit that may be purchased by the user (e.g., a compact disc for a video game system).

User equipment 118 may also have translator 130. Translator 130 may be any suitable combination of hardware and software capable of translating one or more versions of play information received by user equipment 118 into suitable instructions (e.g., a series of commands similar to those generated by a video game controller) for directing graphics processing equipment 113 to generate animated video. In some embodiments of the present invention, translator 130 may be integrated with graphics processing equipment 113.

Figure 2:
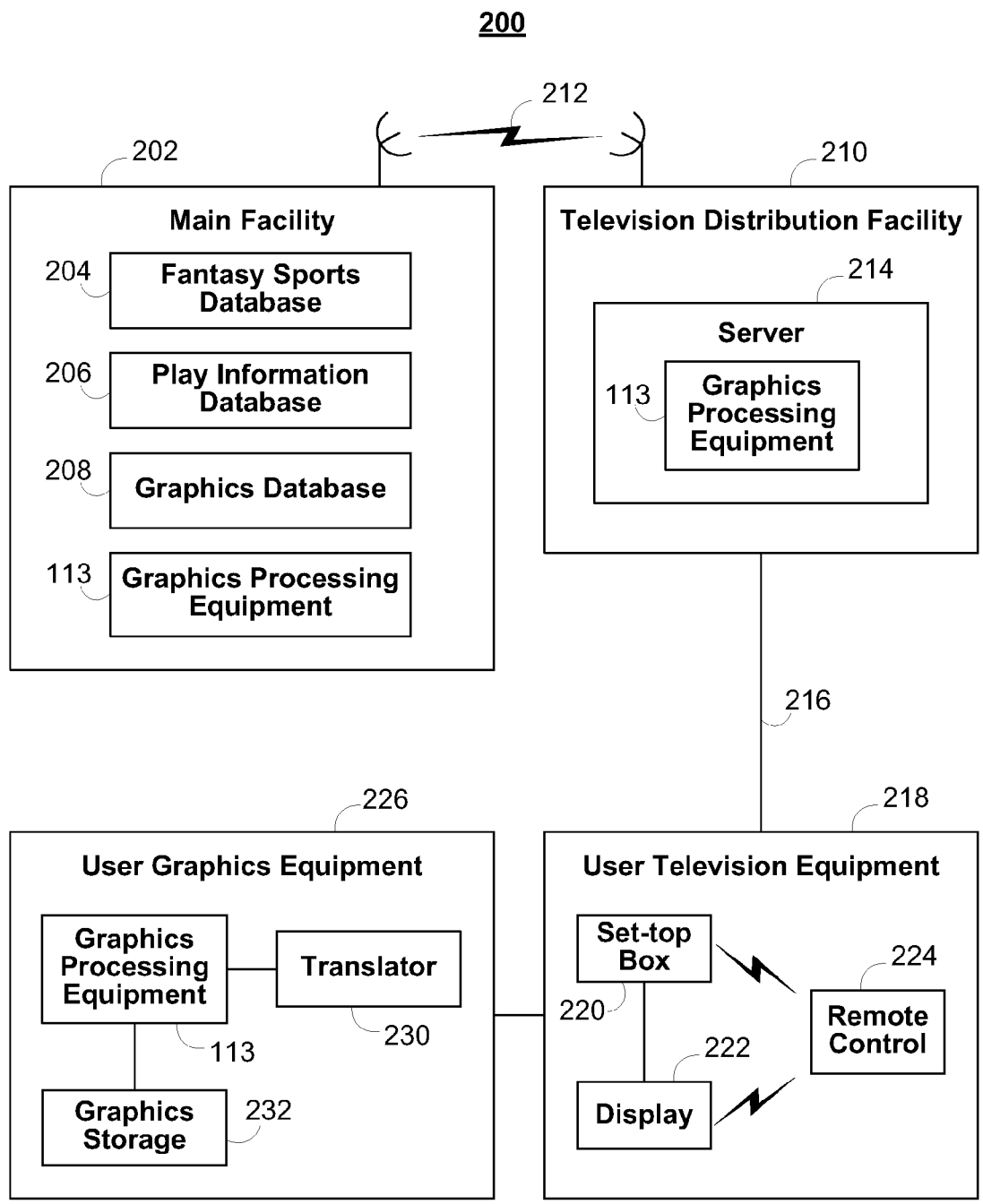
FIG. 2 is a schematic diagram of an illustrative interactive television system in accordance with one embodiment of the present invention.

In one embodiment of the present invention, the fantasy sports contest application may be implemented on an interactive television platform. FIG. 2 shows such an illustrative fantasy sports contest system 200. Main facility 202 may include fantasy sports contest database 204, play information database 206, graphics database 208, and graphics processing equipment 113. fantasy sports contest database 204 may include fantasy sports-related information or any other suitable information relevant to the operation of one or more fantasy sports.

Play information database 206 may include descriptions of real-life plays in one or more sports categories such as descriptions of a touchdown in a football games, a slam dunk in a basketball game, a home run in a baseball, or any other suitable sports play. Play description may include detailed information specific to the play such as the sport (e.g., football, baseball, basketball, rugby, etc.), the players involved (e.g., player names), the play type (e.g., touchdown, slam dunk, home run, etc.), play location (e.g., name of stadium), the outcome (e.g., lost the ball), or any other information specific to a particular play. In some embodiments of the present invention, a few versions of play description may be stored for a single play, whereby each version may be used to generate animated video using one or more types of graphics processing equipment.

Graphics database 208 may include graphics animation programs and various sports-related audio and graphics that may be used to depict real-life plays in various sports categories. Graphics stored in graphics database 112 may include, for example, images of sports stadiums and arenas (e.g., Madison Square Garden, Soldiers Stadium, Camden Yards, etc.), images of players (e.g., Michael Jordan, Jerry Rice, Tiger Woods, etc.), images of uniforms (e.g., New York Yankee's home and away uniforms, cheerleader uniforms, historical team uniforms, etc.), or any other suitable graphics or graphics-related details (e.g., color, texture, etc.) for generating realistic animated videos.

Graphics processing equipment 113 may be any combination of hardware and software capable of interpreting play information (e.g., from play information database 110 or any other suitable location) and generate animated audio based on the play information using graphics, audio, and graphics animation programs available to it (e.g., provided by graphics database 208). Animated videos generated by graphics processing equipment 113 may be optimized as streaming videos and communicated to user equipment with other fantasy sports information.

Data from main facility 202 may be communicated to television distribution facility 210 over communication link 212. Data files from main facility 202 may be, for example, encapsulated as objects transmitted using a suitable Internet based addressing scheme and protocol stack (e.g., a stack using user datagram protocol (UDP) and Internet protocol (IP) information).

Communication link 212 may be any suitable communication link for communicating and distributing fantasy sports-related data. Communication link 212 may be, for example, a satellite link, a telephone link, a cable or fiber optic link, a microwave link, an Internet link, a combination of such links, or any other suitable communication link. In some arrangements, video signals (e.g., associated with animated video for depicting plays) may be communicated over communication link 212. In these arrangements, a relatively high bandwidth link such as a satellite link my be preferable to a relatively low bandwidth link such as a telephone line for efficiency.

Television distribution facility 210 is any suitable facility for distributing television signals to users. Television distribution facility 210 may be, for example, a cable system headend, a broadcast distribution facility, a satellite television distribution facility, or any other suitable facility. Television distribution facility 210 may receive fantasy sports contest data (e.g., rosters, standings, statistical information, or any other suitable data), play information (e.g., various versions of description of plays), graphics animation programs, audio, graphics (e.g., graphics for depicting plays), videos (e.g., animated videos depicting plays), and any other suitable data from main facility 202. Television distribution facility 210 of some embodiments of the present invention may also receive such data from facilities that are similar to but separate from main facility 202.

Regardless of the data source, fantasy sports contest data, play information, graphics animation programs, audio, graphics, and animated videos may be maintained on server 214 within television distribution facility 210 if desired. Server 214 may be capable of handling text, graphics, video, and providing interactive services such as handling product and service orders, tracking user, or any other suitable interactive service. In some embodiments of the present invention, server 214 may also have graphics processing equipment 113 for generating animated videos using graphics animation programs, audio, and graphics based on play information received from main facility 202. Server 214 may be based on one or more computers.

Television distribution facility 210 may provide fantasy sports contest data, play information, graphics animation programs, audio, graphics, animated videos, and any other suitable data to user television equipment 218 or any other suitable user equipment over communication link 216. Data may be distributed by television distribution facility 210 using a variety of techniques. For example, text and graphics may be distributed over an out-of-band channel using an out-of-band modulator, while large quantity of video may be distributed using one or more digital channels for better efficiency. If desired, text and graphics may also be communicated using digital channels.

Communications link 216 may be any communications link suitable for communicating fantasy sports-related information. Communications link 216 preferably has sufficient bandwidth to allow television distribution facility 210 to communicate scheduled television programming, pay programming, advertising and promotional videos, play information, graphics, animated video, and any other suitable data to user television equipment 218. Communications link 216 may be, for example, a satellite link, a telephone network link, a cable or fiber optic link, a microwave link, an Internet link, a data-over-cable service interface specification (DOCSIS) link, a combination of such links, or any other suitable communication link. There are often multiple pieces of user television equipment 218 and multiple associated communications link 216, although only one of each are shown in FIG. 2 to avoid over-complicating the drawings. If desired, fantasy sports contest data, play data, graphics, animated videos, or any other suitable data may be distributed by one or more distribution facilities that are similar to, but separate, from television distribution facility 210 using one or more communications links that are separate from communications link 216 (e.g., using Internet links).

User television equipment 218 may include a receiver such as set-top box 220 or any other suitable television or computer equipment into which circuitry similar to set-top box circuitry has been integrated. For clarity, the present invention is described primarily in the context of user television equipment including a set-top box. However, it should be apparent to those skilled in the art that the fantasy sports contest application may be implemented using user television equipment 218 that is based on, for example, a handheld computing device, or any other suitable equipment. In some embodiments of the present invention, fantasy sports contest application may be implemented using a client-server setup, where user television equipment 218 may be a client processor and one or more servers such as server 214 may act as the server processor.

Fantasy sports contest-related data, play information, graphics animation programs, audio, graphics, animated video, and other related data may be communicated to set-top box 220 periodically (e.g., once per hour, once per day, etc.), continuously, or on-demand. Data may also be transmitted from set-top box 220 to television distribution facility 210 for processing. Such data may include, for example, requests for certain fantasy sports contest data, submitted data (e.g., animated video setup information, etc.), or any other suitable data. Television distribution facility 210 may process the data and take appropriate action, for example, storing animated video setup information (e.g., on server 214), providing the user with animated video, or performing any other suitable actions.

If desired, certain functions such as a user's instructions to make a change in his roster or request for animated video depicting plays may be communicated by set-top box 220 over separate communications links to facilities separate from television distribution facility 210 (e.g., main facility 102) for processing. In these embodiments, some of the communication involving set-top box 220 may be made directly with the separate facilities.

Each set-top box 220 may include a processor to handle tasks associated with implementing a fantasy sports contest application on set-top box 220. Television distribution facility 210 may include a processor for handling tasks associated with the distribution of fantasy sports contest data, play information, graphics animation programs, audio, graphics, animated videos, or any other suitable data.

Fantasy sports contest information and animated videos received from television distribution facility 210 by set-top box 220 may be displayed for the user on display 222. One or more remote controls such as remote control 224 may be used to control set-top box 220 and display 222. Alternatively, user input devices such as wireless keyboards, mice, trackballs, or any other suitable input devices may be used to communicate with set-top box 220 and display 222 in place of remote control 224.

In some embodiments of the present invention, user graphics equipment 226 may be configured to generate animated video. User graphics equipment 226 may be coupled to user television equipment 218 and may receive play information from set-top box 220, for example, through a dataport (e.g., a Universal Serial Bus port, a FireWire port, etc.). User graphics equipment 226 may have graphics processing equipment 113, translator 230, and graphics storage 232 for processing play information and generating animated video based on the play information.

Graphics processing equipment 113 may any suitable combination of hardware and software for executing graphics animation programs to generate animated video such as a video game system. Graphics storage 232 may include graphics animation programs that may be accessed and executed by graphics processing equipment 113 to generate animated video. Graphics storage 232 may also include sports-related audio and graphics that may include, for example, images of sports stadiums (e.g., Madison Square Garden, Soldiers Stadium, Camden Yards, etc.), images of players (e.g., Michael Jordan, Jerry Rice, Tiger Woods, etc.), images of uniforms (e.g., New York Yankee's home and away uniforms, cheerleader uniforms, historical team uniforms, etc.), or any other suitable graphics or graphics-related details (e.g., color, texture, etc.) for generating realistic animated videos. In some embodiments of the present invention, graphics storage 232 may store graphics, audio, graphics animation programs, and other information communicated with other fantasy sports contest data from television distribution facility 210 for the purpose of depicting plays. In other embodiments, graphics storage 232 may be a detachable unit that may be purchased by the user (e.g., storage associated with a video game player).

User graphics equipment 226 may also have translator 230. Translator 230 may be any suitable combination of hardware and software capable of translating one or more versions of play information received by user equipment into suitable instructions (e.g., a series of commands similar to those generated by a video game controller) for directing graphics processing equipment 113 to generate animated video. In some embodiments of the present invention, translator 230 may be integrated with graphics processing equipment 113.

Figure 3:
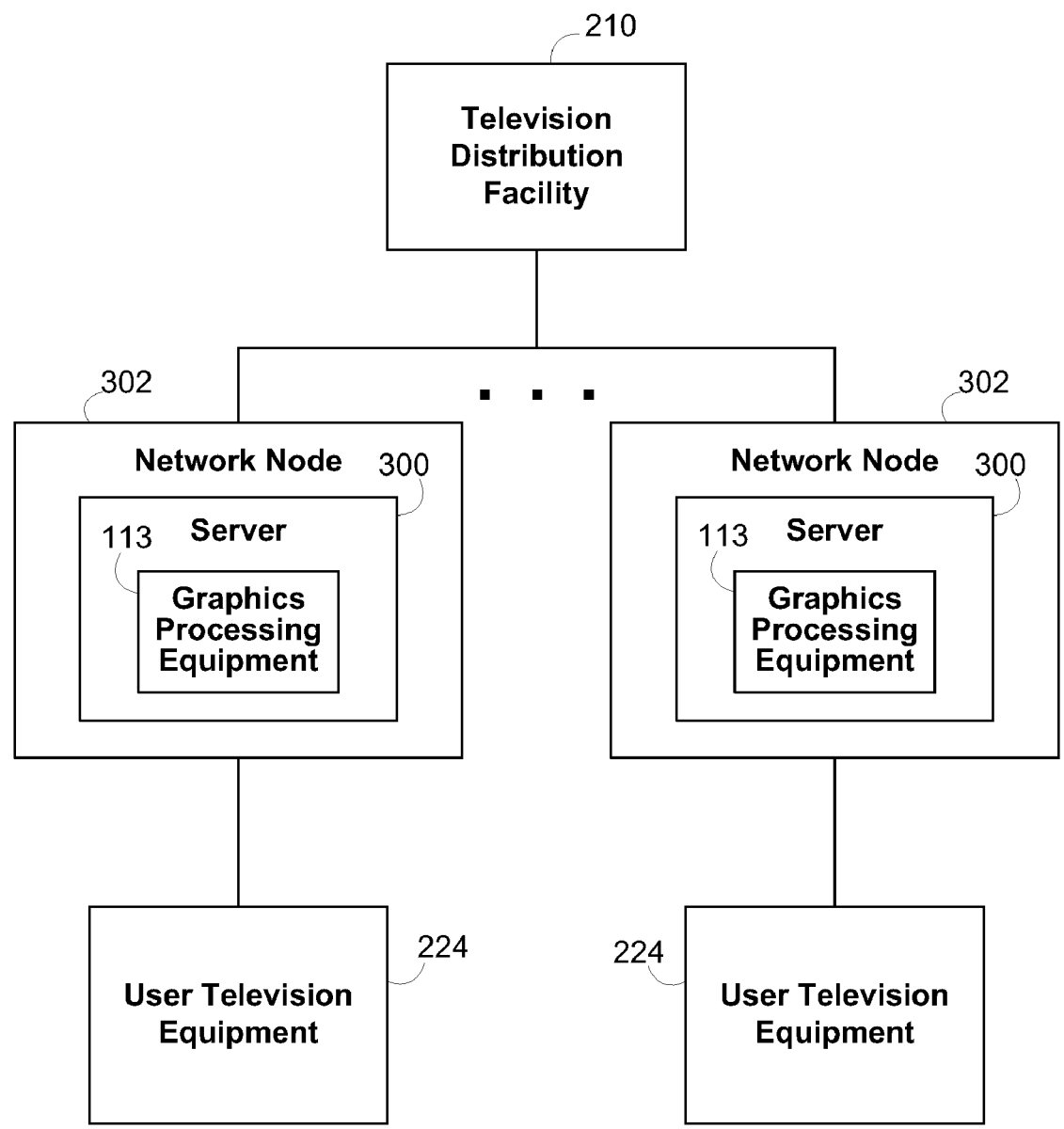
FIG. 3 is a schematic diagram of an illustrative interactive television system in accordance with one embodiment of the present invention.

FIG. 3 shows an alternative arrangement for communicating data from television distribution facility 210. Server 214 residing at television distribution facility 210 may be replaced by or used in conjunction with servers 300 located at network nodes 302. Play information, graphics animation programs, audio, and graphics may be downloaded periodically (e.g., once per hour, once per day, etc.) or continuously in a looping arrangement from servers 300 and stored locally. When a looping arrangement is implemented, a map may be provided periodically to indicate the location of the most recent information. Fantasy sports contest application implemented using set-top box 220 (FIG. 2) may access downloaded play information and graphics locally when needed and use the map to locate the most recent downloaded information on the digital channels.

In another suitable arrangement, server 214 (FIG. 2) or servers 300 (FIG. 3) may be used separately or in conjunction to provide animated video upon request. If desired, server 214 or servers 300 may provide instructions to set-top box 220 (FIG. 2) informing the location of the animated video on a particular digital channel. Animated videos may be distributed to set-top box 220 along with fantasy sports contest data. A cable modem may be used to communicate texts, graphics, and videos. Play information, graphics animation programs, audio, graphics, and animated videos for depicting real-life plays may be communicated using a combination of these techniques or any other suitable technique.

In some embodiments of the present invention, servers 300 may include graphics processing equipment 113, which may be any combination of hardware and software capable of interpreting play information (e.g., received from television distribution facility 210) and generate animated video based on the play information using graphics, audio, and graphics animation programs available to it (e.g., from television distribution facility 210). Animated videos generated by graphics processing equipment 113 may be optimized as streaming videos and communicated to user equipment with other fantasy sports information.

The fantasy sports contest application may be any suitable software, hardware or both that may be used to implement the features of the present invention. The fantasy sports contest application may be implemented at any suitable location in system 100 (FIG. 1) and system 200 (FIG. 2). For example, the fantasy sports contest application may be implemented at user equipment 118 (FIG. 1), at server 102 (FIG. 1), at television distribution facility 210 (FIG. 2), at main facility 202 (FIG. 2), at any other suitable location (that is not necessarily shown in system 100 or system 200), or at any combination thereof. For example, in system 200 of FIG. 2, certain portions of the fantasy sports contest application may be implemented at user equipment 224, (e.g., those portions that implement features involved in user interaction), whereas certain other portions of the fantasy sports contest application may be implemented at television distribution facility 210 (e.g., those portions that implement features involved in the processing of client requests and in the tracking of the performance of users). Any such suitable arrangement of the fantasy sports contest application may be implemented in accordance with the present invention.

Aspects of the operation of fantasy sports contest applications are described in U.S. Pat. Nos. 4,918,603 (Hughes, et al.), 5,846,132 (Junkin), 5,971,854 (Junkin), and 6,193,610 (Junkin), which are all hereby incorporated by reference herein in their entireties.

Figure 4:
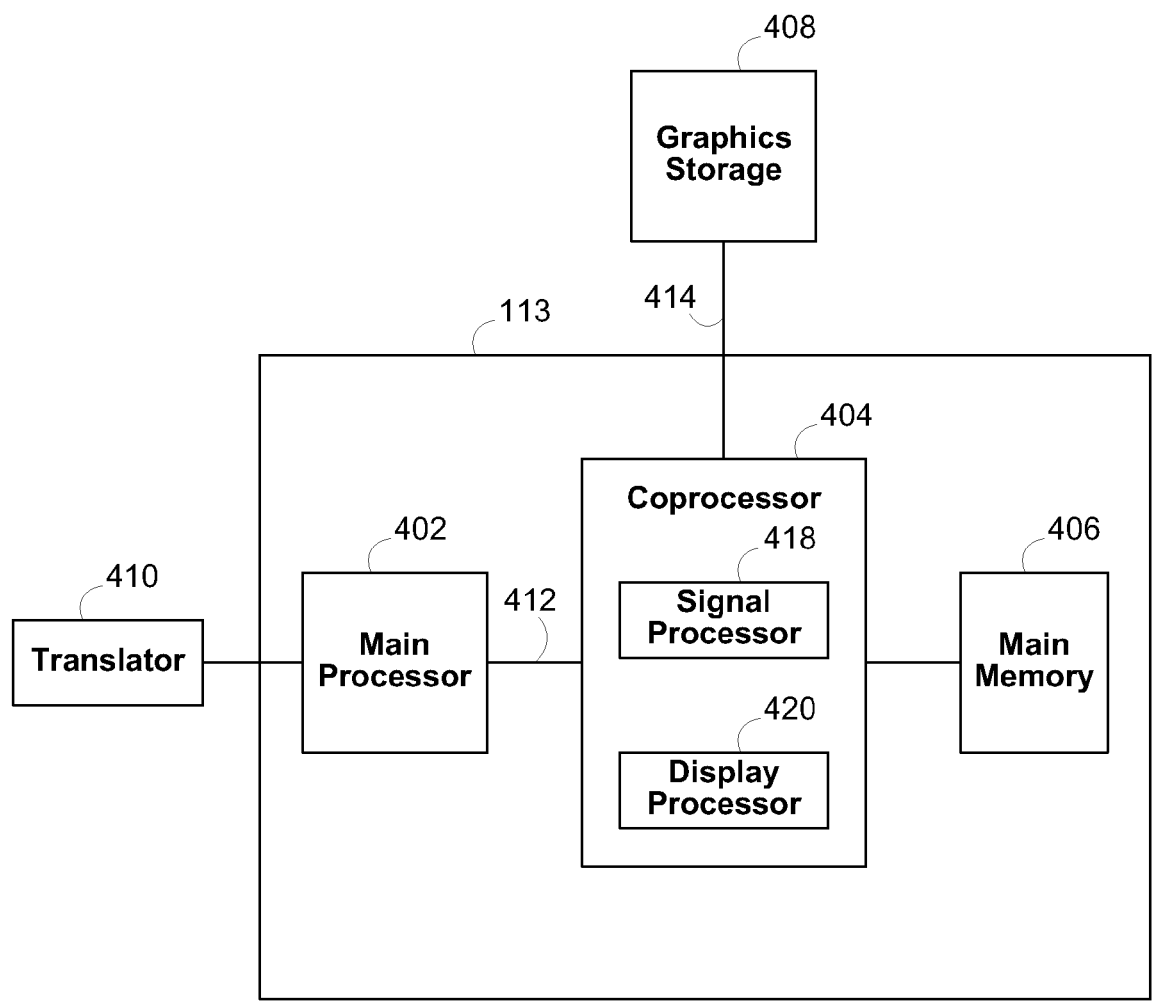
FIG. 4 is a schematic diagram of an illustrative graphics processing equipment in accordance with one embodiment of the present invention.

FIG. 4 shows a schematic diagram of an illustrative graphics processing equipment 113 in accordance with one embodiment of the present invention. Graphics processing equipment 113 may be any combination of hardware and software suitable for generating animated video. For example, graphics processing equipment 113 may use the circuitry and software found in Sony PlayStation 2™, Microsoft Xbox™, Nintendo GameCube™, their successor consoles, or any other suitable device, to generate animated video.

Graphics processing equipment 113 may generally include, for example, main processor 402, coprocessor 404, and main memory 406. Main processor 402 may receive play information describing a particular play through translator 410 or directly from the equipment providing such information. The play information may be provided from, for example, server 102 (FIG. 1), server 214 (FIG. 2), set-top box 220 (FIG. 2), or any other suitable equipment.

Translator 410 may be any combination of hardware and software (e.g., an API, a software module, a software kernel, etc.) for translating play information (e.g., play type, player name, etc.) into instructions that may be interpreted by main processor 402. The instructions may be a series of commands similar to those generated by a standard controller (e.g., of a video game system) to direct main processor 402 to generate animated video.

For example, play information describing a touchdown made by a receiver may include, for example, initial position (e.g., yard line, location relative to the width of the field, etc.), details about the pass (e.g., on the run, jumped up, ran in a zigzag pattern to avoid another player, etc.), touchdown location (e.g., in the middle, on the left, etc.), and any other suitable information. In response to receiving this play information, translator 410 may generate a series of commands that may instruct graphics processing equipment 113 to duplicate the play (e.g., a sequence of left, forward, back, and right commands to duplicate the run, a jump command while catching the ball in midair, etc.) to be sent to main processor 402.

In response to receiving appropriate commands from translator 410, main processor 402 may interpret the commands and issue internal commands to direct coprocessor 404 to generate images and sounds to depict the play using data stored in main memory 406. For example, main processor 402 may execute a graphics animation program stored in main memory 406 in response to receiving commands from translator 410. Main processor 402 may then create lists of commands to direct coprocessor 404 to generate the animation to depict the play. The lists of commands may include, for example, lists of graphics commands (e.g., display lists) and lists of audio commands (e.g., play lists). The display lists may direct coprocessor 404 to generate appropriate graphics for the animated video, while the play lists may direct coprocessor 404 to generate accompanying sounds.

Main processor 402 may specify a new display list and new play list for every frame required to depict all the movements in the play. Main processor 402 may store the display lists and play lists in main memory 406 and provide coprocessor 404 with the location. Main processor 402 may also make sure that main memory 406 includes all of the appropriate graphics and audio required to carry out the commands listed in the display lists and play lists.

Main memory 406 may be any fast memory that is capable of storing the information that main processor 402 and coprocessor 404 require to function. Main memory 406 may allow the information to be shared between the two processors. Stored information may include, for example, graphics animation programs, graphics, audio, or any other suitable data copied from suitable locations such as graphics storage 408. In the arrangement shown, main processor 402 accesses the graphics animation programs stored in graphics storage 408 through coprocessor 404 over communication path 412. In other arrangements, main processor 402 may directly access graphics storage 408 via communication path 414. In still other arrangements, main processor 402 may copy or download the graphics animation programs from graphics storage 408 into main memory 406, and may then access the programs in main memory 406 via coprocessor 404.

Coprocessor 404 may include a special purpose high performance application-specific integrated circuit (ASIC) having an internal design that is optimized for rapidly processing 3-D graphics and digital audio. In response to commands issued by main processor 402, coprocessor 404 may generate video and audio using graphics, audio and other data stored within main memory 406 and graphics storage 408. Coprocessor 404 may include signal processor 418 and display processor 420. Signal processor 418 may be an embedded programmable microcontroller that performs graphics geometry processing and audio digital processing under control of a "microcode" computer program (e.g., a computer program that tells the signal processor what to do). The microcode program may be a graphics animation program copied from graphics storage 408.

Display processor 420 may be any suitable equipment for creating images using graphics available from main memory 406 or graphics storage 408. Because most display equipment displays 30 or 60 new images a second, display processor 420 may create a series of frames that change with similar or faster frame rate to produce the animation effect. Both signal processor 418 and display processor 420 may be controlled by main processor 402. Signal processor 418 may also be configured to supervise the display processor 420 by sending graphics commands to it.

As an example, signal processor 418 may read the display lists and play lists from main memory 406 and process the lists by accessing additional data (e.g., graphics, audio, or any other suitable data) storied within main memory 406 or graphics storage 408. Signal processor 418 may subsequently generate audio output data for storing within main memory 406 and direct graphics display commands to display processor 420 to create accompanying graphics. In some embodiments of the present invention, signal processor 418 may directly provide the graphics display commands to display processor 420 over a path internal to coprocessor 404. In other embodiments, it may store display commands in main memory 406 and provide display processor 420 with their location information.

Display processor 420 may draw specified geometric shapes, construct specified images, fill in specified colors, textures, and pattern, or perform any other suitable action based on the commands. Display processor 420 may store images created for each "frame" (e.g., depicting every change in a player's movement) in main memory 406.

An "audio interface" and a "video interface" (not shown) may read the audio output data and images from main memory 406 and convert them into appropriate signals (e.g., streaming video signal) to be distributed to user equipment 118 or user television equipment 218 for display.

These and other features of video game systems suitable for generating animated video to depict plays are described, for example, in Van Hook et al. U.S. Pat. No. 6,166,748, issued Dec. 26, 2000, which is hereby incorporated by reference herein in its entirety.

The fantasy sports contest application may provide animated videos to visually depict plays that have taken place in various sporting events such as football games, basketball games, golf tournaments, tennis tournaments, horse races, or any other event suitable for supporting a fantasy sports contest. Plays that may be depicted in these sporting events may include, for example, a touchdown, a slam-dunk, a putt, a serve, a pass, or any other play that may be of interest to the user.

Animated videos may be any suitable generated video for visually communicating a play that have taken place in a sporting event. Animated video may be, for example, moving graphics (e.g., stick figures, body outlines, images of real-life elements, etc.), cartoons, computer-generated videos, or any other suitable video.

In some embodiments of the present invention, the fantasy sports contest application may create animated video using realistic graphical representation of real-life elements, for example, player facial features, stadium layouts, team uniforms, or any other suitable element that may be depicted based on a real-life element. In other embodiments of the present invention, the fantasy sports contest application may provide animated video generated using default graphical elements such as default player physiques that may assume features of various body types, default uniforms that may change in color to represent various teams, or any other suitable default graphical element.

Figure 5:
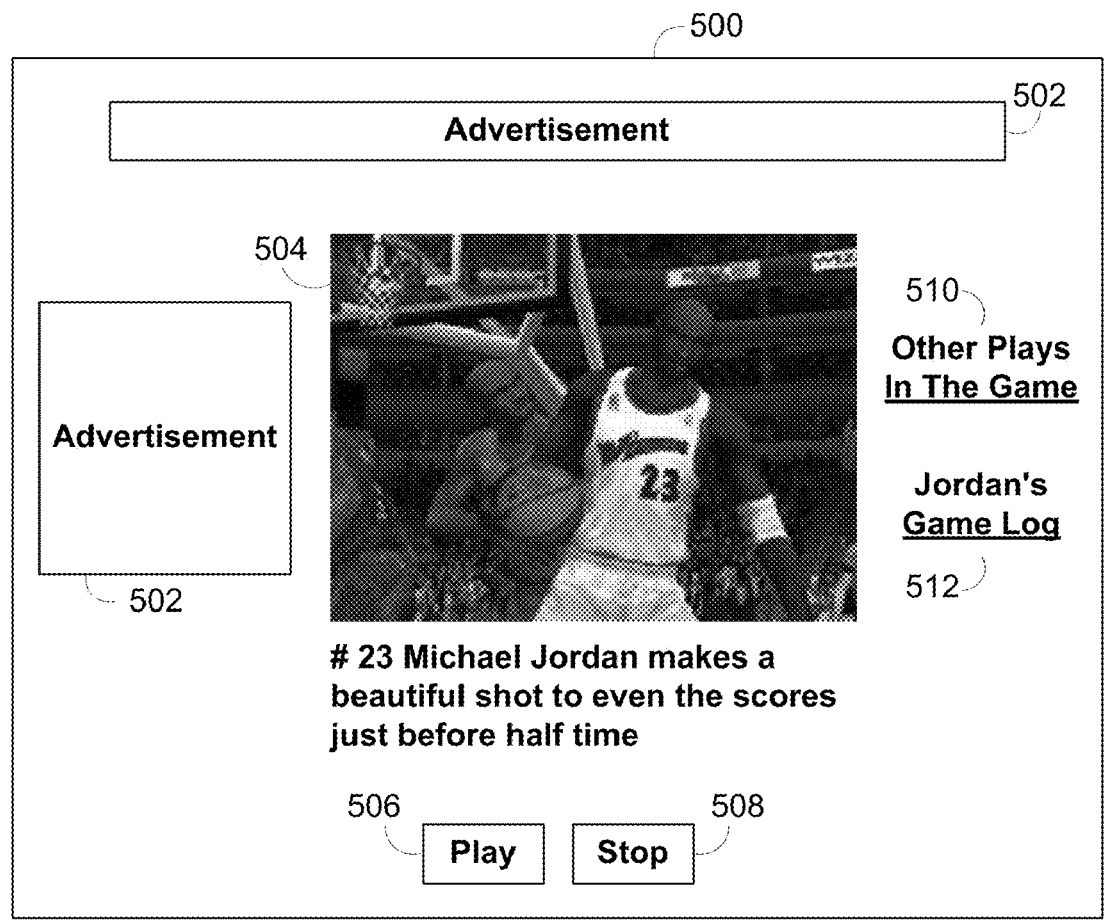
FIG. 5 is an illustrative fantasy sports animated video screen having a currently playing animated video that is generated using realistic graphical representation of real-life elements in accordance with one embodiment of the present invention.

FIG. 5 shows an illustrative fantasy sports animated video screen 500 having a currently playing animated video and fantasy sports contest information. Fantasy sports animated video screen 500 may include one or more advertisements 502, an animated video screen 504, buttons or other mechanisms (e.g., buttons 506 and 508) for controlling the animated video, and other fantasy sports contest information (e.g., links 510 and 512).

In this example, animated video screen 504 includes animated video for depicting a shot made by Washington Wizard's Michael Jordan. Realistic graphical representation of real-life elements such as player facial features, stadium layouts, team uniforms, and other representation of real-life elements, are used to depict this particular play. The user may start and stop playing of the animated video in animated video screen 503 by, for example, selecting buttons 506 or 508.

Other fantasy sports contest information that may be displayed on the screen may include, for example, link 510 for accessing information regarding other plays made in the same game as the currently playing animated video, link 512 for accessing information associated with Michael Jordan, who is depicting in the current animated video, and any other suitable fantasy sports contest information.

Fantasy sports animated video screen 500 is merely illustrative of such a display screen. Various other suitable display screens may be used.

Figure 6:
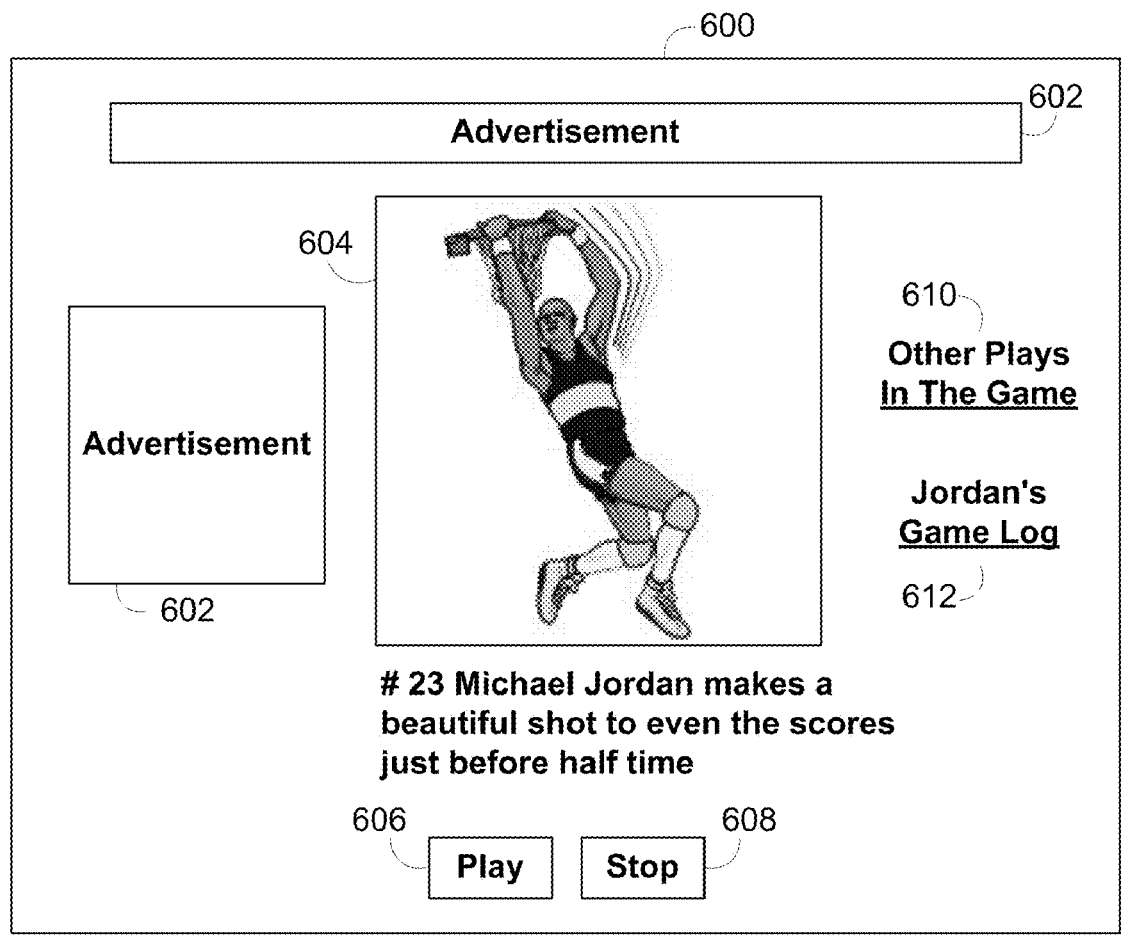
FIG. 6 is an illustrative fantasy sports animated video screen having a currently playing animated video that is generated using default graphical elements in accordance with one embodiment of the present invention.

FIG. 6 shows another illustrative fantasy sports animated video screen 600 also having a currently playing animated video and fantasy sports contest information. Instead of using realistic graphical representation of real-life elements such as player facial features, stadium layouts, team uniforms, and other representation of real-life elements, to depict the play as shown in FIG. 5, the fantasy sports contest application provides in animated video screen 604 an animated video that depicts the Michael Jordan Shot using default graphical elements such as default player physique, default uniform, and other default graphical elements.

Fantasy sports animated video screen 600 is merely illustrative of such a display screen. Various other suitable display screens may be used.

In some embodiments of the present invention, the fantasy sports contest application may associate animated video for depicting plays in sporting events with various fantasy sports contest information provided in connection with those sporting events (e.g., statistical information). As an example, the fantasy sports contest application may display a description of a touchdown pass in a football game that has resulted in six points for the user with an associated animated video link. When the user selects the link, the fantasy sports contest application may provide the user with one or more animated videos for depicting the pass. The one or more animated videos may depict the pass, for example, from different angles, focusing on various players (e.g., one animated video may focus on the thrower while another may focus on the receiver), from various distances, or according to any other suitable specification.

As another example, a statistics page displaying, for example, statistics associated with an athlete on the user's fantasy sports basketball team, may have links associated with various statistics (e.g., assists, steals, blocks, 3 point shots, etc.). The fantasy sports contest application may provide the user with one or more animated videos for depicting plays made by the athlete that have resulted in a particular statistic when the link associated with that statistic is selected (e.g., the fantasy sports contest application may provide three animated videos in association with a steal statistic of 3).

In some embodiments of the present invention, the fantasy sports contest application may provide additional features for the user to manipulate the currently playing animated video. Such features may include, for example, camera angle control, speed control, zoom control, or any other suitable feature (e.g., FIGS. 8 and 11).

Figure 7:
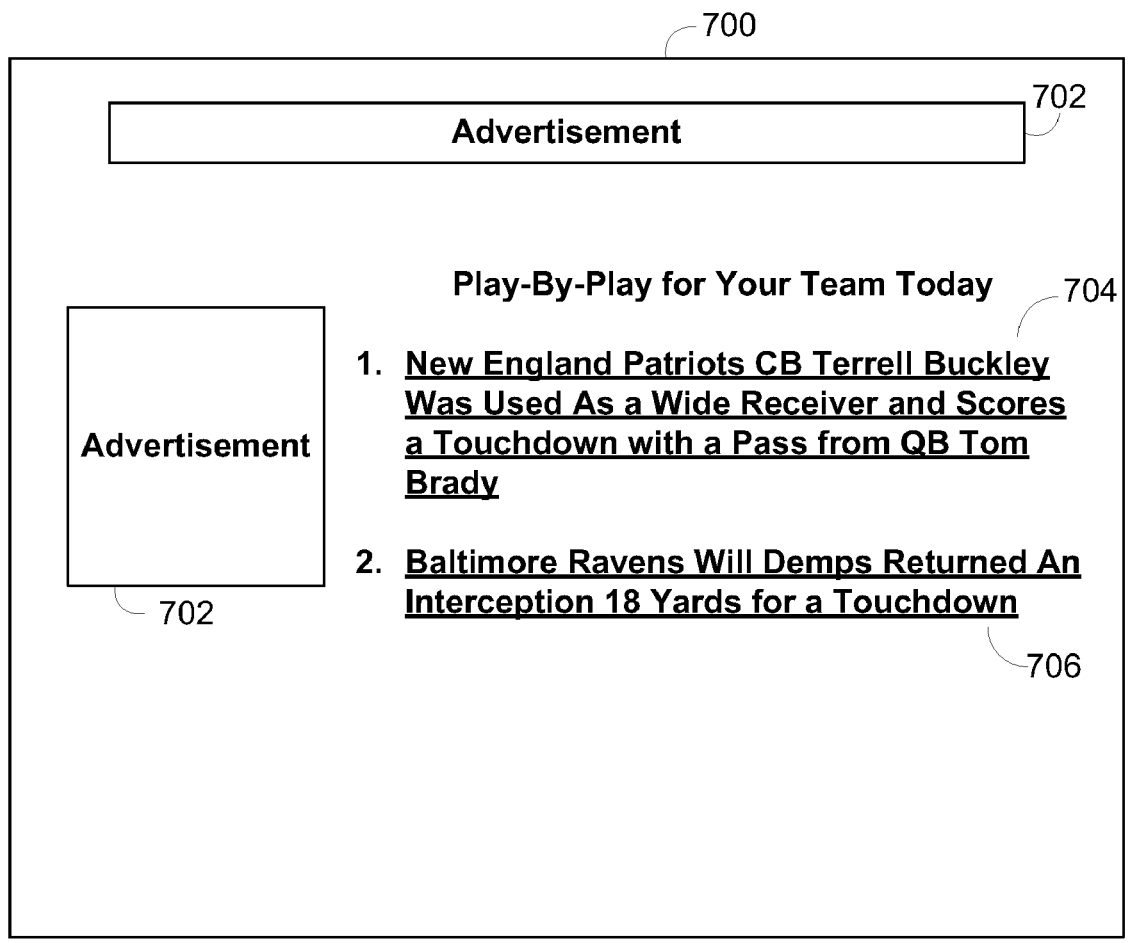
FIG. 7 is an illustrative fantasy sports fantasy sports daily play-by-play screen in accordance with one embodiment of the present invention.

FIG. 7 shown an illustrative fantasy sports daily play-by-play screen 700 in accordance with one embodiment of the present invention. Screen 700 may include one or more advertisements 702 and play-by-play description of the plays that have resulted in scores for the user's team on that particular day. In this example, the fantasy sports contest application displays in screen 700 descriptions of two touchdown plays that have resulted in points for the user in the fantasy sports contest. Each description is associated with an embedded link (e.g., illustrated by the underlines). In response to the user selecting link 704 or 706, the fantasy sports contest application may provide the user with animated videos for depicting the described play.

Fantasy sports daily play-by-play screen 700 is merely illustrative of such a display screen. Various other suitable display screens may be used.

Figure 8:
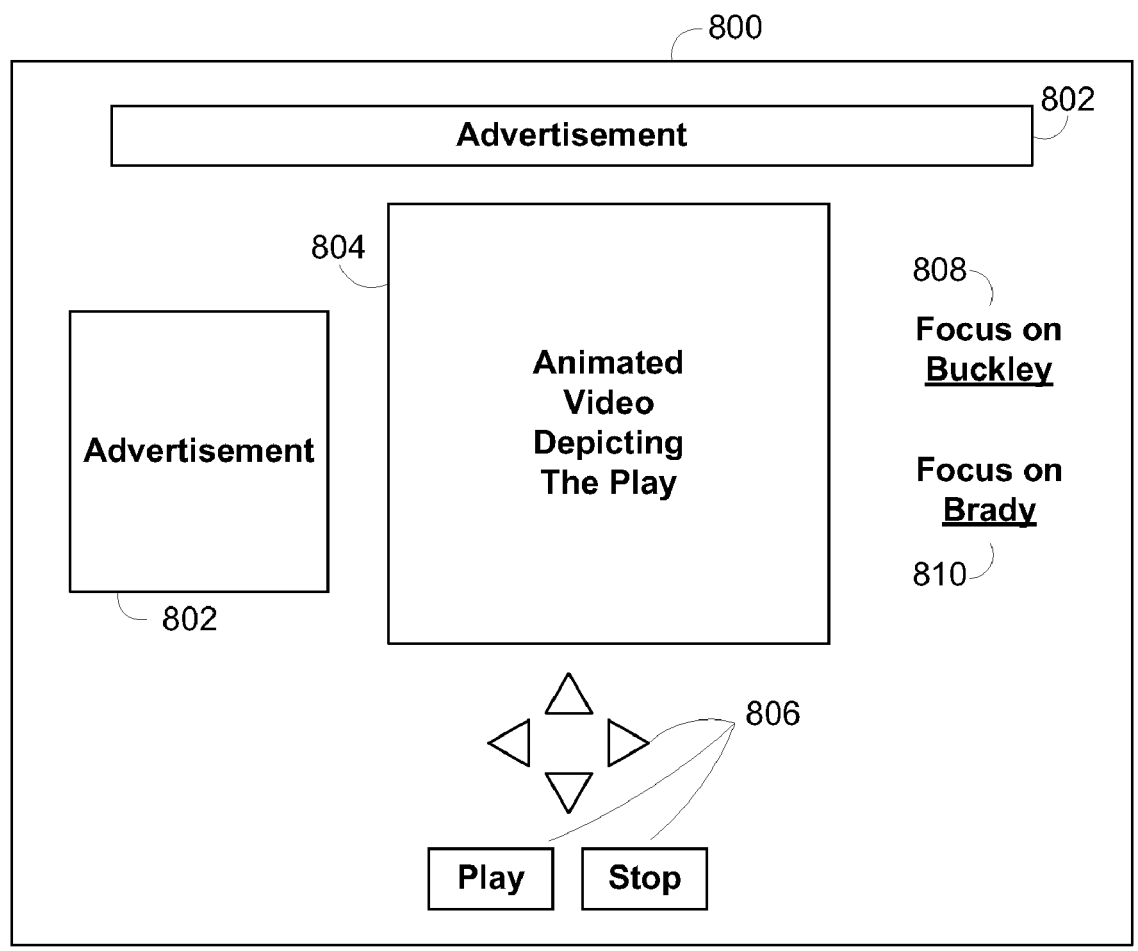
FIG. 8 is an illustrative fantasy sports animated video display screen in accordance with one embodiment of the present invention.

FIG. 8 shown an illustrative fantasy sports animated video display screen 800 in accordance with one embodiment of the present invention. The fantasy sports contest application may show FIG. 8, for example, in response to the user selecting link 704 or 706 on screen 700 of FIG. 7.

Screen 800 may include one or more advertisements 802, an animated video window 804, controls 806 for controlling playing of the animated video, and other information and options associated with the animated videos. In this example, screen 800 displays animated video-related information that is associated with a touch down pass made by Terrell Buckley and Tom Brady, which has resulted in points for the user's fantasy sports football team. The fantasy sports contest application may display the animated video depicting the pass in animated video window 804. The user may start, stop, and control the angle of the animate video using controls 806. The user may also play animated videos that depict the play by focusing on either Buckley or Brady during the pass through selection of links 808 and 810.

Fantasy sports animated video display screen 800 is merely illustrative of such a display screen. Various other suitable display screens may be used.

Figure 9:
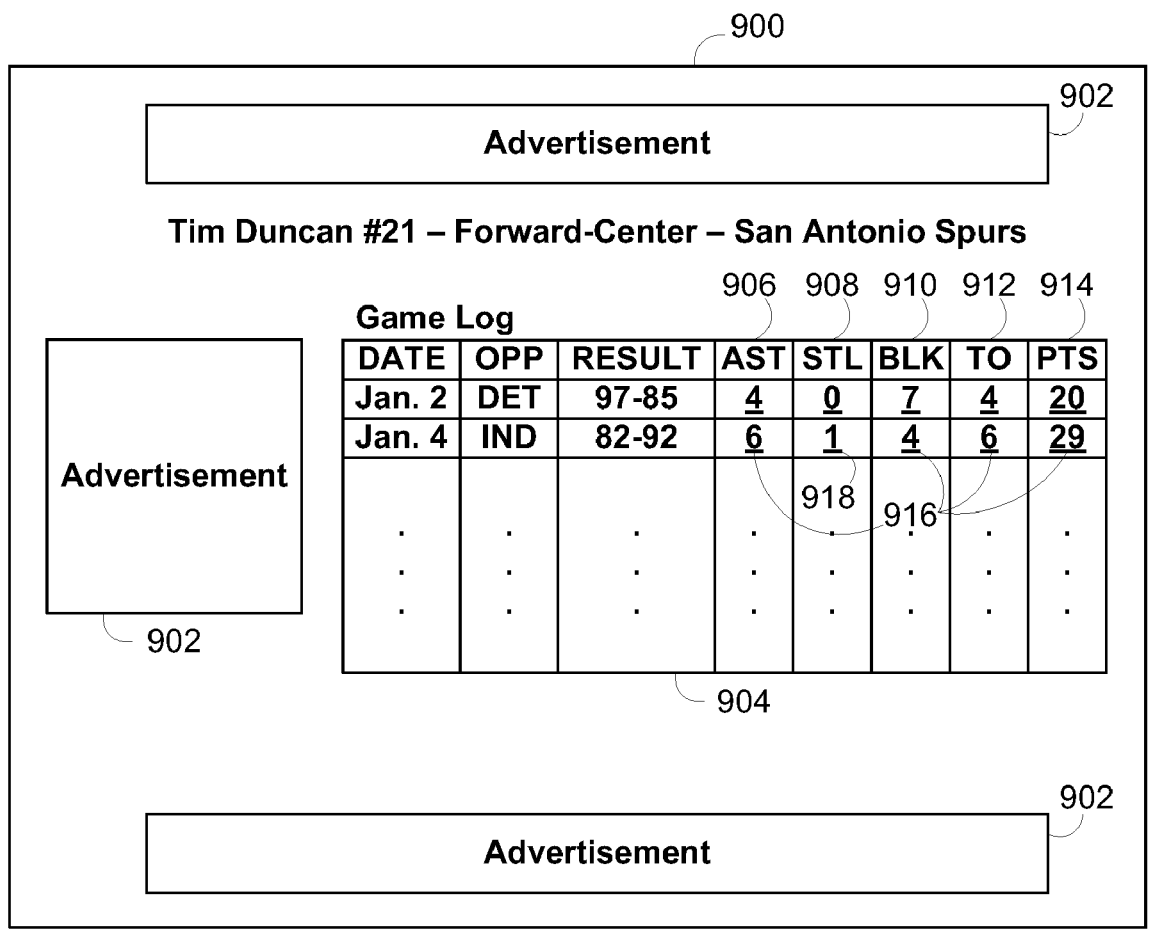
FIG. 9 is an illustrative fantasy sports statistics screen in accordance with one embodiment of the present invention.

FIG. 9 shows an illustrative fantasy sports statistics screen 900 in accordance with one embodiment of the present invention. Screen 900 may include one or more advertisements 902 and various contest-related statistics associated with the user's team. In this example, screen 900 includes game log table 904 in which various game statistics associated the user's center player Tim Duncan in a basketball contest are displayed.

In game log table 904, statistics that are associated with animated videos such as those statistics in the categories assists 906, steals 908, blocks 910, turnovers 912, and points 914, may appear as selectable links 916. The display characteristics of selectable links 916 may be different from other statistics to indicate their association with animated videos (e.g., underlined). The user may select one of links 916 by, for example, using a mouse to click a link, using up or down buttons to position a highlight region over the link and then pressing an "Enter" or "Select" button on a remote control, or using any other suitable approach.

Fantasy sports statistics screen 900 is merely illustrative of such a display screen. Various other suitable arrangements may be used.

In some embodiments of the present invention, the fantasy sports contest application may provide animated videos to depict various plays in various sporting events based on user-supplied animated video setup information. Animated video setup information may include, for example, user graphics animation program information, user graphics processing equipment information, user request information for pre-generated animated videos, or any other suitable information. In response to receiving the animated video setup information from the user (e.g., FIG. 10), the fantasy sports contest application may store the information in association with the user at a suitable location (e.g., a database).

Figure 10:
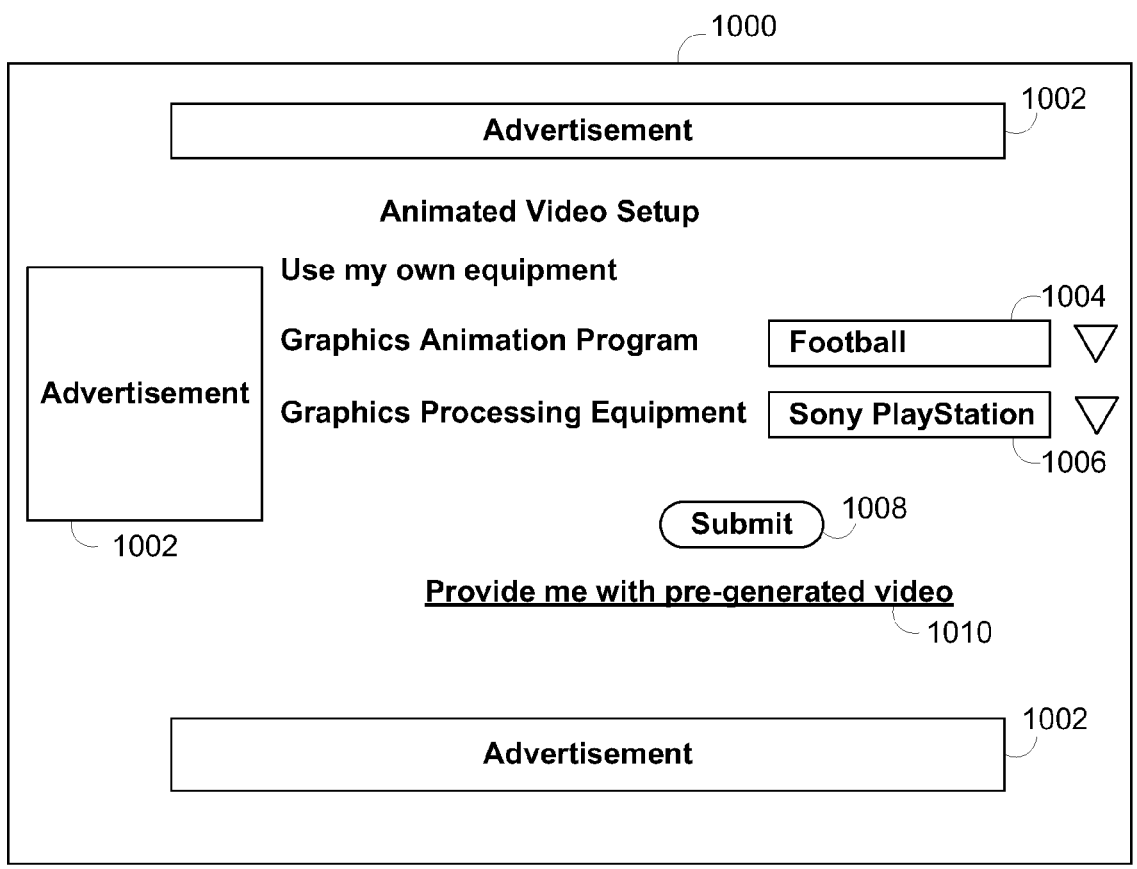
FIG. 10 is an illustrative fantasy sports animated video setup screen in accordance with one embodiment of the present invention.

As an example, the user may request during animated video setup to be allowed to generate animated videos using the user's own graphics processing equipment (e.g., a video game system) and graphics animation programs (e.g., video game programs) (e.g., FIG. 10). Such an arrangement may significantly reduce the bandwidth requirement that is normally associated with downloading video onto the user equipment. In response to this request, the fantasy sports contest application may provide the user with suitable information for instructing the user's specific equipment to generate any desired animated video.

In some of these embodiments, the fantasy sports contest application may create various versions of play information to describe the same play in a particular sporting event. Each version of play information may be interpreted by one or more types of user graphics processing equipment to generate animated video on user equipment. The fantasy sports contest application may provide an appropriate version of play information to the user based on various selection criteria. For example, based on the processing power of the user's graphics processing equipment, the fantasy sports contest application may select an appropriate version of play information for instructing the user's graphics processing equipment to generate animated video.

In some embodiments of the present invention, the fantasy sports contest application may provide a standard version of play information to the user equipment for instructing the user equipment to generate animated video. Additional component such as a translator (e.g., API, software kernel, module, or any other suitable component) may be downloaded or purchased by the user for translating the standard version of play information into information compatible with the user's particular equipment.

In some embodiments of the present invention, the fantasy sports contest application may allow the user to choose during animated video setup to be provided with pre-generated animated videos that require no additional processing on the user equipment (e.g., FIG. 10). In these embodiments, the fantasy sports contest application may generate animated videos using graphics processing equipment located at a remote location and provide the animated videos as, for example, streaming videos, to the user equipment. In some embodiments of the present invention, the fantasy sports contest application my provide pre-generated animated videos to user equipment automatically as a default feature. The fantasy sports contest application may allow the user to change this default feature through animated video setup.

FIG. 10 shows an illustrative fantasy sports animated video setup screen 1000 in accordance with one embodiment of the present invention. Animated video setup information and options and one or more advertisements 1002 may be included on screen 1000. In some embodiments of the present invention, the fantasy sports contest application may show animated video setup screen 1000 during user registration. In other embodiments of the present invention, the fantasy sports contest application may display animated video setup screen 1000 in response the user selecting a link associated with animated video for the first time (e.g., selectable links 704 or 706 of FIG. 7 or links 916 of FIG. 9).

In this example, the fantasy sports contest application presents the user with two options for obtaining animated video in animated video setup screen 1000. The first option is tailored to users who may desire to generate animated video using the user's own equipment. In choosing this option, the user may supply user equipment information to the fantasy sports contest application by, for example, indicating any graphics animation program that the user may possess from a drop down menu 1004, indicating appropriate graphics processing equipment that may be available to generate animated video from drop down menu 1006, or supplying any other suitable information that may enable the fantasy sports contest application to provide the user with suitable play information for generating animated video on user equipment. The user may submit the information using, for example, submit button 1008 or any other suitable mechanism.

Alternatively, the user who prefers to receive pre-generated animated video, may choose a second option by, for example, selecting link 1010 on screen 1000. In response to the user selecting link 1010, the fantasy sports contest application may provide the user with additional information associated with this option. The additional information may be, for example, subscription information associated with provision of pre-generated animated video or any other suitable information. For example, the fantasy sports contest application may provide the user with forms in which the user may supply credit card information or any other suitable information.

Fantasy sports animated video setup screen 1000 is merely illustrative of such a display screen. Various other suitable arrangements may be used.

Figure 11:
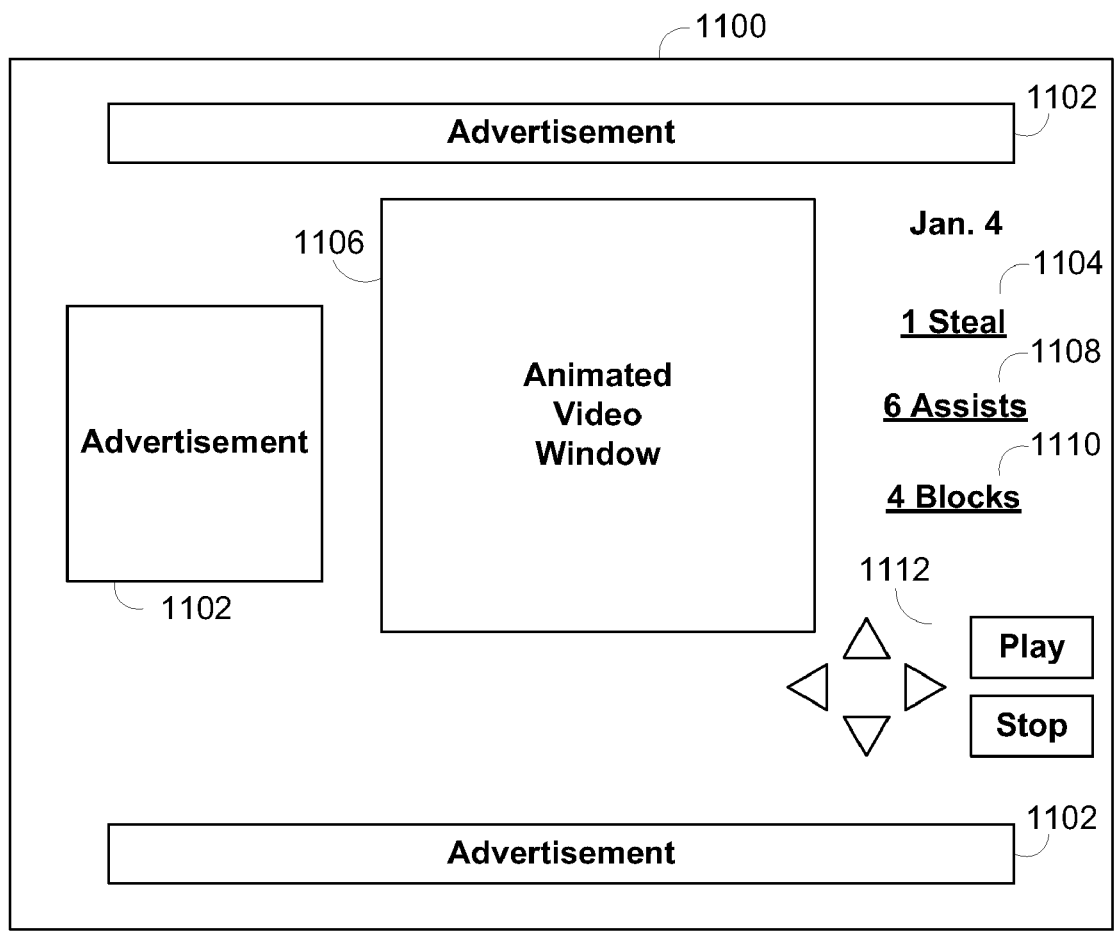
FIG. 11 is an illustrative fantasy sports play animation screen in accordance with one embodiment of the present invention.

FIG. 11 shows an illustrative fantasy sports animated video screen 1100 having an animated video window in accordance with one embodiment of the present invention. The fantasy sports contest application may show fantasy sports animated video screen 1100 in response to the user selecting links 704 or 706 of FIG. 7 or links 916 of FIG. 9 (given that the user has already completed animated video setup). Screen 1100 may include various fantasy sports contest information and one or more advertisements 1102.

In this example, the fantasy sports contest application presents the user with an animated video window 1106 and selectable links 1104, 1108, and 1110 in fantasy sports animated video screen 1100, where selectable links 1104, 1108 and 1110 are associated with animated video for depicting steal, assists, and blocks made by the user's center player Tim Dunkin on January 4th. The user may select link 1104, 1108, or 1110 by, for example, clicking the link using a mouse, using up or down buttons on a remote control to place a highlight region over link 1104 and then pressing an "Enter" or "select" button, or using any other suitable approach.

In response to the user selecting one of links 1104, 1108, or 1110, the fantasy sports contest application may play suitable animated video to depict the selected play or plays made by Tim Dunkin in animated video window 1106. The user may control playing of the animated video in animated video window 1106 using controls 1112.

Fantasy sports animated video screen 1100 is merely illustrative of such a display screen. Various other suitable arrangements may be used.

In some embodiments of the present invention, the fantasy sports contest application may allow the user to create a play based on a particular real-life play using user equipment. First, the fantasy sports contest application may generate an initial scene based on the real-life play. The initial scene may be, for example, an animated video frame that depicts a particular scene in the real-life play. Upon displaying the initial scene to the user, the fantasy sports contest application may allow the user to control the progression of events following the initial scene. For example, the fantasy sports contest application may allow the user to control a particular athlete involved in the real-life play similar to the way that the user may be allowed to control a character in a convention video game system.

As an example, the user may be allowed to control a soccer player that attempts a goal in a real-life play in a soccer game. The user may control the progression of events by instructing the player to shoot at the upper right hand corner of the goal instead of shooting at the lower left hand corner of the goal as according to the real-life event.

As another example, the fantasy sports contest application may allow the user to control the progression of events by allowing the user to instruct the goalie to jump to the left of the goal in anticipating of the kick as opposed to jump to the right as according to the real-life event.

The fantasy sports contest application may generate the progression of events produced under the user's control and may then display the progression to the user. In some embodiments of the present invention, the fantasy sports contest application may provide additional information to the user equipment. Additional information may be, for example, information for instructing the user equipment to generate the progression of events based on the user's instructions.

Figure 12:
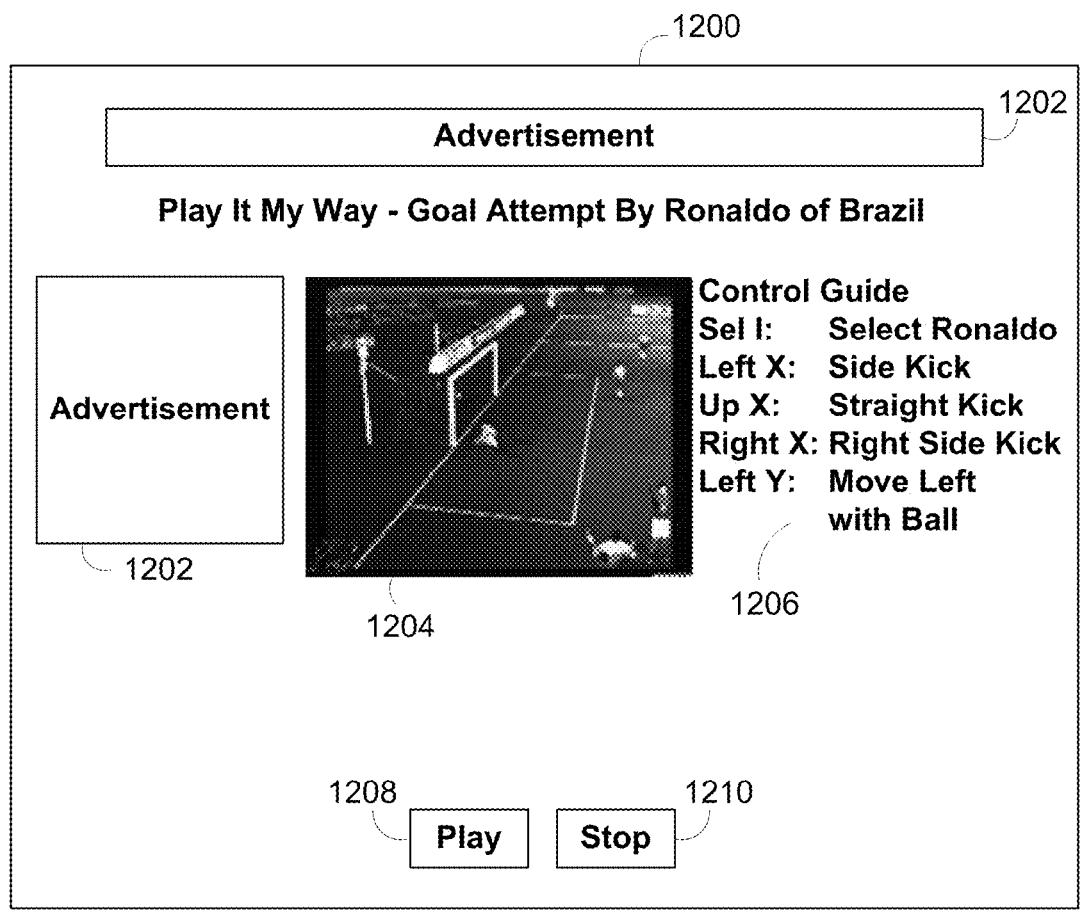
FIG. 12 is an illustrative fantasy sports play-it-my-way screen in accordance with one embodiment of the present invention.

FIG. 12 shown an illustrative fantasy sports play-it-my-way display screen 1200 in accordance with one embodiment of the present invention. Screen 1200 may include one or more advertisements 1202, animated video window 1204, control guide 1206, buttons or other mechanisms for starting and stopping the animated video.

In this example, screen 1200 allows the user to create a play that is based on a goal attempt by Ronaldo of Brazil in the 2002 world cup. The fantasy sports contest application may allow the user to create the player by allowing the user to control the Ronaldo character shown in the initial scene. The user may control the character using suitable controls available on user equipment (e.g., video game console) according to control guide 1206. The user may start or stop playing of the animated video using buttons 1208 and 1210. In this example, the fantasy sports contest application may be programmed to allow the goalie to attempt to block the shot. In another suitable arrangement, the goalie's actions may be controlled by, for example, another user.

Fantasy sports play-it-my-way display screen 1200 is merely illustrative of such a display screen. Various other suitable displays may be used.

Figure 13:
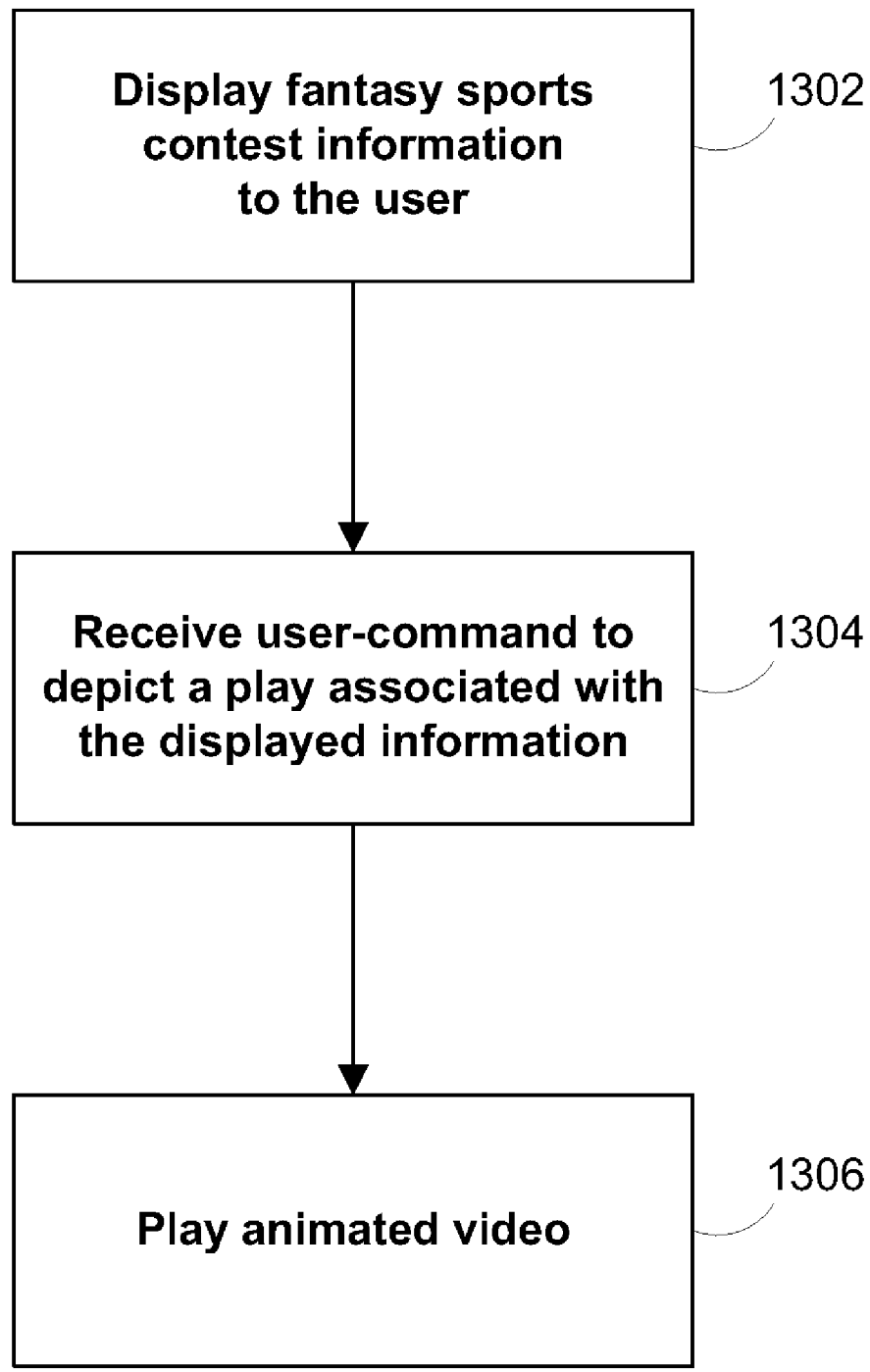
FIG. 13 is a flow chart of illustrative steps involved in providing animated video in accordance with one embodiment of the present invention.

FIG. 13 shows a flow chart of illustrative steps involved in playing an animated video depicting a play in a sporting event in accordance with one embodiment of the present invention. At step 1302, the fantasy sports contest application may provide the user with fantasy sports contest information. The fantasy sports contest information may be any information related to fantasy sports contests or other contest-related information (e.g., rankings, scores, athletes, teams, advertisements, highlights, animations, etc.). The fantasy sports contest information may have one or more associated animated videos for depicting various plays (e.g., FIGS. 7 and 9) that are described by the fantasy sports contest information.

The fantasy sports contest application may receive a user-command requesting one of the animated videos for depicting a play associated with the displayed fantasy sports contest information at step 1304. The user may issue the user-command by, for example, selecting a displayed link that is associated with animated video using a mouse, pressing an appropriate button for requesting animated video on a remote control, or using any other suitable approach.

In response to receiving the user-command requesting the animated video, the fantasy sports contest application may play the animated video associated with the displayed fantasy sports contest information to the user in, for example, a screen such as screen 800 of FIG. 8 or screen 1100 of FIG. 11 at step 1306.

Figure 14:
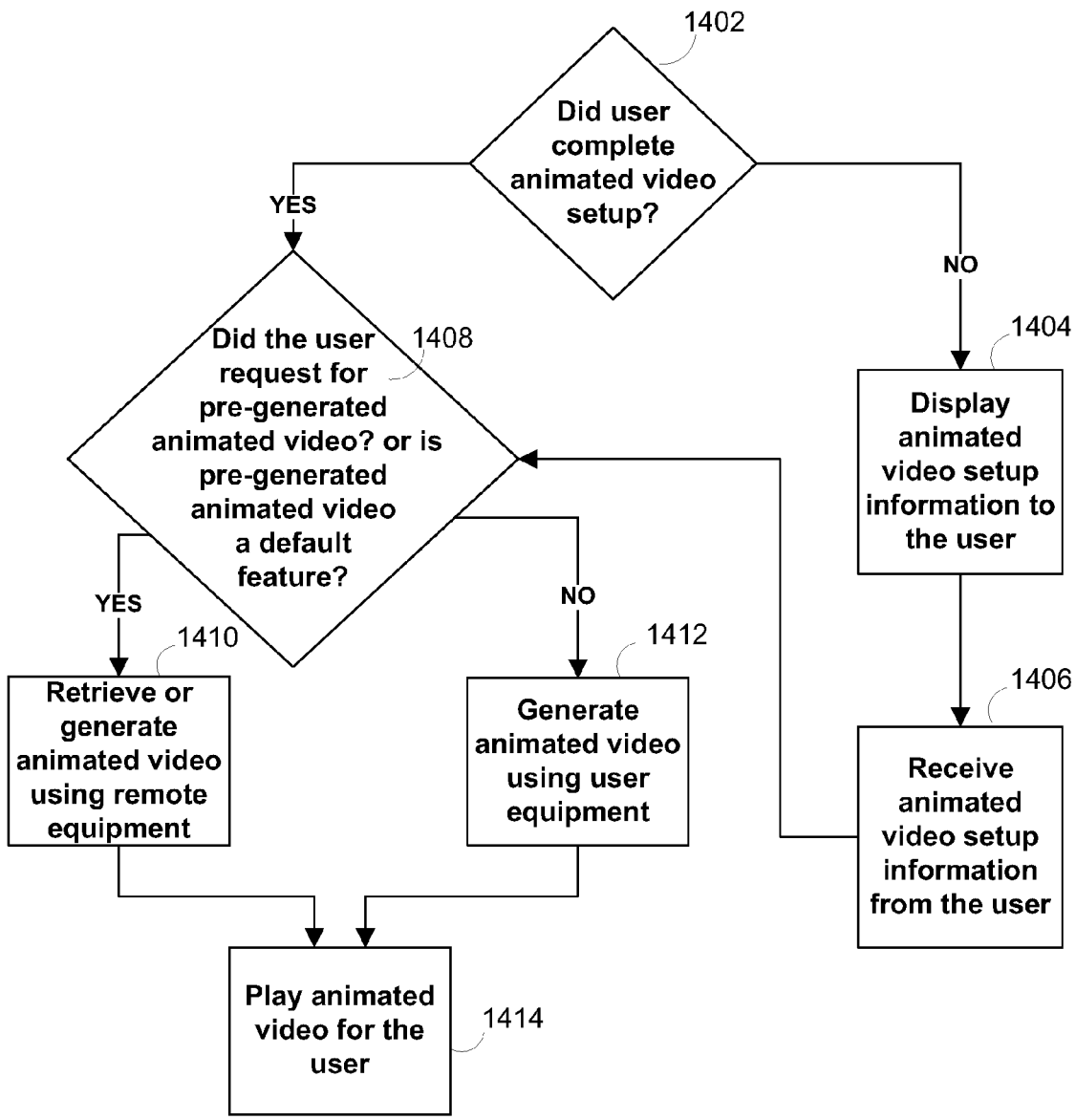
FIG. 14 is a flow chart of illustrative steps involved in providing animated video based animated video setup information in accordance with one embodiment of the present invention.

FIG. 14 shows a more detailed flow chart of illustrative steps involved in playing the animated video for the user (step 1306 of FIG. 13) in accordance with one embodiment of the present invention. At step 1402, the fantasy sports contest application may determine whether the user has completed the appropriate animated video setup (e.g., screen 1000 of FIG. 10) for receiving or generating animated video. The fantasy sports contest application may determine such information by, for example, searching for animated video setup information associated with the user in a suitable database (e.g., fantasy sports contest database 106 of FIG. 1, fantasy sports contest database 204 of FIG. 2, suitable database on server 214 of FIG. 2, etc.), reading animated video setup information from a cookie installed on user equipment, or using any other suitable approach.

If the fantasy sports contest application determines that the user has not completed animated video setup, the fantasy sports contest application may provide the user with animated video setup information and options such as those presented in animated video setup screen 1000 (FIG. 10) at step 1404. Once appropriate animated video setup information has been received from the user at step 1406, the fantasy sports contest application may then proceed to step 1408.

At step 1408, the fantasy sports contest application may determine whether the user has requested to receive pre-generated animated video. The fantasy sports contest application may determine such information by, for example, retrieving animated video setup information from a suitable database (e.g., fantasy sports contest database 106 of FIG. 1, fantasy sports contest database 204 of FIG. 2, suitable database on server 214 of FIG. 2, etc.), reading animated video setup information from a cookie stored on user equipment, or using any other suitable approach.

In the case that the user has chosen to receive pre-generated animated video, the fantasy sports contest application may retrieve or generate animated video remotely at, for example, television distribution facility 210 of FIG. 2, main facility 202 of FIG. 2, server 102 of FIG. 1, or any other remote location having suitable software and hardware for generating and storing such animated videos. The fantasy sports contest application may then provide the retrieved or generated animated video to the user equipment at step 1410.

In the alternative case that the user has chosen to generate animated video on the user equipment, the fantasy sports contest application may provide appropriate play information for instructing the user equipment to generate animated video to the user equipment at step 1412. The appropriate play information may be, for example, a specific version of play information that is created based on user-submitted user equipment information, graphics animation program information, or any other suitable information. The specific version of play information may be compatible with the specific hardware and software available for generating animated video on the user equipment.

Alternatively, the appropriate play information may be, for example, a standard version of play information that may be interpreted by a translator or any other suitable combination of hardware and software at the user equipment into instructions compatible with the hardware and software available for generating animated video on the user equipment. Subsequently, animated video may be generated using user equipment according to the instructions included in the received play information.

Regardless of the source of the animated video, the fantasy sports contest application may play the animated video for depicting a play in a sporting event for the user at step 1414.

Figure 15:
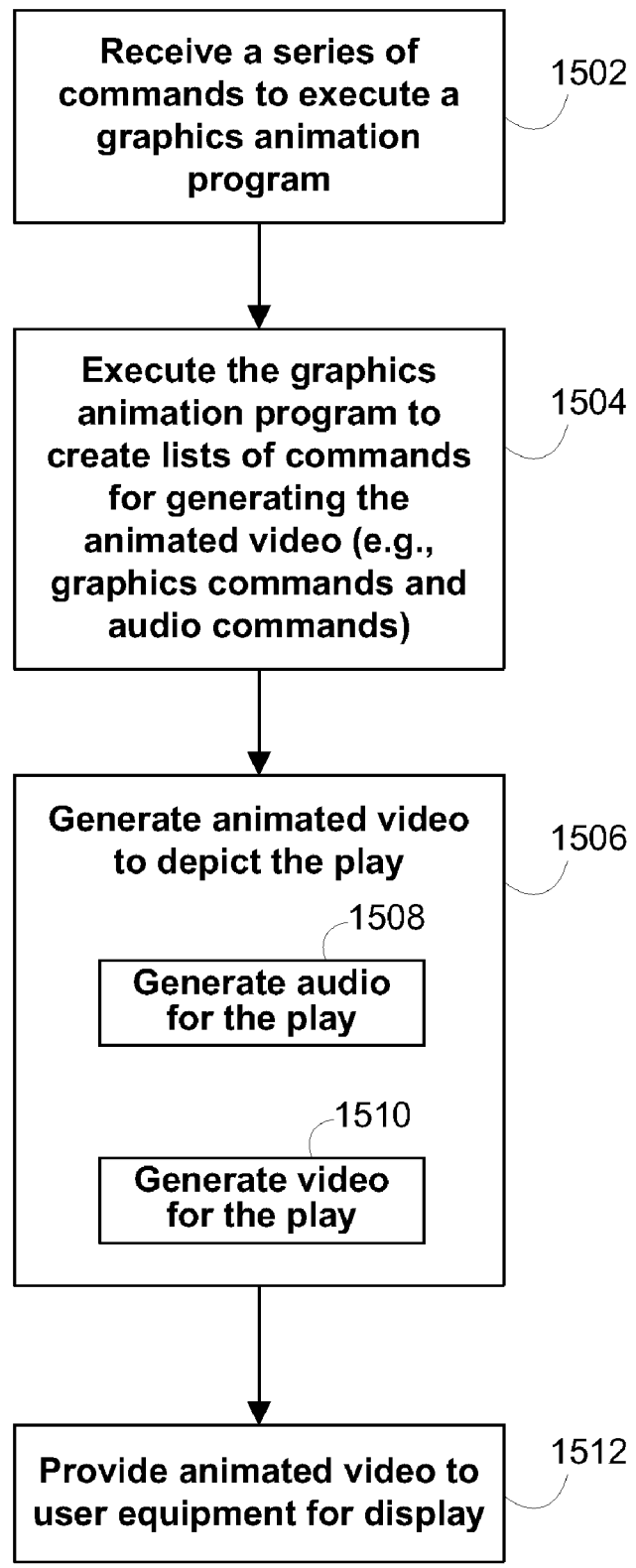
FIG. 15 is a flow chart of illustrative steps involved in generating animated video in accordance with one embodiment of the present invention.

FIG. 15 shows a more detailed flow chart of illustrative steps involved in generating animated video to depict a play as shown in steps 1410 and 1412 of FIG. 14 in accordance with one embodiment of the present invention.

At step 1502, suitable graphics processing equipment may receive a series of appropriate commands for execute a suitable graphics animation program (e.g., video game program). The graphics processing equipment may be any suitable equipment for generating animated video located at, for example, server 102 of FIG. 1, user equipment 118 of FIG. 1, main facility 202 of FIG. 2, television distribution facility 210 of FIG. 2, user graphics equipment 226 of FIG. 2, server 300 of FIG. 3, or any other suitable location.

The graphics processing equipment may access the appropriate graphics animation program (e.g., video game program) for execution at step 1504. The graphics animation program may be, for example, a video game program stored in a suitable graphics storage (e.g., a video game console storage). Upon executing the graphics animation program, the graphics processing equipment may generate a series of appropriate internal commands to direct appropriate internal possessors (e.g., signal processor 418 and display processor 420 of FIG. 4) to generate animated video. The series of appropriate internal commands may include, for example, graphics commands for instructing the internal processors to create frames of animation from various graphics, audio commands for instructing the internal processors to create audio associated with the animation, any other suitable command, or combination thereof.

As an example, main processor 402 of FIG. 4 may generate a list of commands for directing coprocessor 404 of FIG. 4 to generate animated video for depicting the play described by the received play information. The list of commands may include both graphics commands (e.g., display lists) and audio commands (e.g., play lists). Main processor 402 of FIG. 4 may specify a new display list and a new play list for every frame required to depict each movement in the animated video. Main processor 402 may then store the commands in main memory 406 of FIG. 4 and provide coprocessor 404 with the location information. Main processor 402 may also make sure that main memory 406 includes all of the appropriate graphics and audio requested by the graphics and audio commands (e.g., graphics and audio copied from graphics storage 408 of FIG. 4).

At step 1506, the graphics processing equipment may generate animated video to depict the play described by the play information based on the lists of commands (e.g., displays lists and play lists) issued at step 1504. Because audio output data requires less time to generate that video output data, the graphics processing equipment may take separate steps to generate audio and video data for the animated video at steps 1508 and 1510. The graphics processing equipment may temporarily store audio output data generated at step 1508 while it generates video data at step 1510.

As an example, coprocessor 404 of FIG. 4 may direct signal processor 418 and display processor 420 to generate the audio and video output data for the animated video. Signal processor 418 (FIG. 4), for example, may read both the display lists and play lists from main memory 406 (FIG. 4) and process the lists of commands by accessing additional graphics and audio data within main memory 406. Signal processor 418 of FIG. 4 may generate audio data for temporary storage in main memory at step 406, while directing graphics display commands for further processing by display processor 420 (FIG. 4). When display processor 420 completes graphics generation for every frame of the animated video, the fantasy sports contest application may use appropriate interfaces to read the audio and graphics data and generate appropriate video signal (e.g., streaming video) to be distributed to the user equipment.

Depending upon the chosen implementation, the fantasy sports contest application may provide animated video to the user equipment using various methods at step 1512. For example, if the animated video is generated at user equipment, the fantasy sports contest application may directly apply animated video signal to the display equipment (e.g., display equipment 124 of FIG. 1, display 222 of FIG. 2, or any other suitable display equipment). Alternatively, if the animated video is generated at a remote location (e.g., server 102 of FIG. 1, main facility 202 of FIG. 2, server 214 of FIG. 2, servers 300 of FIG. 3, or any other suitable location), the fantasy sports contest application may optimize the animated video into, for example, streaming video, and provide the streaming video to the user equipment with other fantasy sports contest data.

Figure 16:
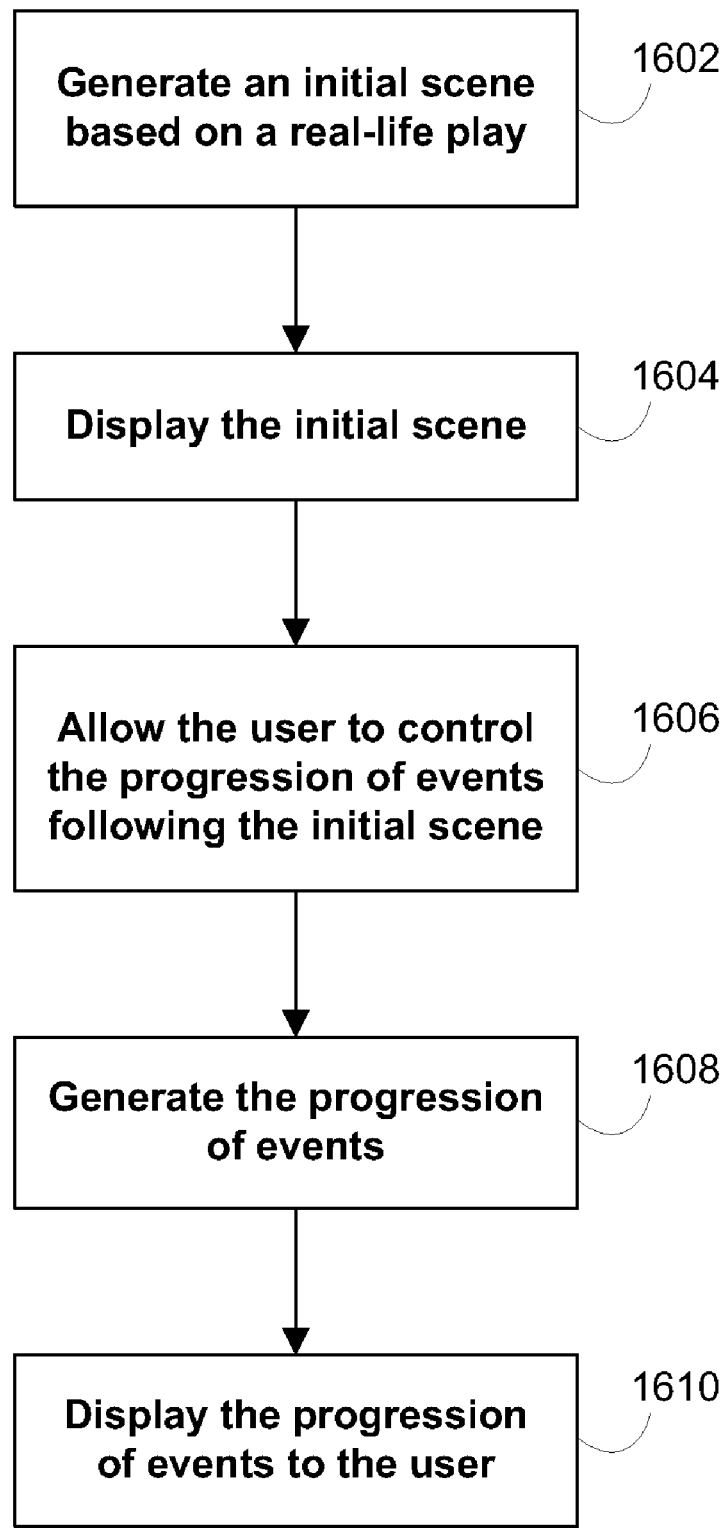
FIG. 16 is a flow chart of illustrative steps involved in allowing the user to create a play based on a real-life play in accordance with one embodiment of the present invention.

FIG. 16 shows a flow chart of illustrative steps involved in allowing the user to create a play based on a real-life play in accordance with one embodiment of the present invention. At step 1602, the fantasy sports contest application generates an initial scene based on a real-life play. The initial scene may be, for example, an animated video frame that depicts a particular scene in the real-life play.

The fantasy sports contest application may display the initial scene to the user at step 1604.

At step 1606, the fantasy sports contest application may allow the user to control the progression of events following the initial scene by, for example, allowing the user to control a player involved in the real-life play.

The fantasy sports contest application may generate the progression of events based on the events produced as a result of the user's control at step 1608.

The fantasy sports contest application may then display the progression of the events generated during step 1608 to the user at step 1610.

Thus, systems and methods for integrating graphic animation technologies in fantasy sports contest applications to depict and animate plays in various sporting events are provided. One skilled in the art will appreciate that the present invention can be practiced by other than the described embodiments, which are presented for purposes of illustration and not of limitation, and the present invention is limited only by the claims which follow.

What is claimed is:

1. A method for using user equipment comprising graphics equipment to provide a graphic animation to a user, the graphic animation depicting at least a portion of a real-life play of a real-life athlete, the method comprising:

generating the graphic animation using the graphics processing equipment to depict a graphical representation of a progression of events occurring during the at least a portion of the real-life play of the real-life athlete, wherein the real-life play takes place in a real-life sporting event;

playing the graphic animation on a display device; and allowing the user to control the playing of the graphic animation using an input device.

2. The method of claim 1, wherein allowing the user to control the playing of the graphic animation comprises allowing the user to select a camera angle from one or more camera angles during the playing of the graphic animation.

3. The method of claim 1, wherein allowing the user to control the playing of the graphic animation comprises allowing the user to control a playing speed.

4. The method of claim 1, wherein allowing the user to control the playing comprises allowing the user to control a zoom operation during the playing.

5. The method of claim 1, wherein the generated graphic animation comprises statistical information related to the real-life sporting event.

6. The method of claim 1, wherein the generated graphic animation comprises statistical information related to an athlete depicted during the playing.

7. The method of claim 1, wherein generating the graphic animation comprises:

obtaining, at a location remote from the user equipment, a standard version of play information, wherein the standard version of the play information is information describing the real-life play; and generating, at the remote location, using the graphics processing equipment, the graphic animation based on the standard version of the play information.

8. The method of claim 1, wherein generating the graphic animation comprises:
obtaining, at a location remote from the user equipment, a conventional video of the real-life play; and
generating, at the remote location, using the graphics processing equipment, the graphic animation based on the conventional video.

9. The method of claim 1, wherein playing the graphic animation comprises:
receiving, at the user equipment, a version of play information that is compatible with the user equipment; and
generating, using the graphics processing equipment, the graphic animation based on the received version of the play information.

10. The method of claim 1, wherein allowing the user control the playing comprises allowing the user to selectively focus on an athlete depicted during at least a portion of the playing.

11. A system for providing graphic animation to a user to depict at least a portion of a real-life play of a real-life athlete, the system comprising:
a user input device;
a user output device comprising a display device; and
server equipment and user equipment comprising graphics processing equipment, wherein the server equipment and the user equipment are configured to:
generate a graphic animation to depict a graphical representation of a progression of events occurring during the at least a portion of the real-life play of the real-life athlete, wherein the real-life play takes place in a real-life sporting event; and
play the graphic animation depicting the real-life play.

12. The system of claim 11, wherein the user input device is configured to allow the user to select a camera angle from one or more camera angles during the playing.

13. The system of claim 11, wherein the user input device is configured to allow the user to control a playback playing speed during the playback playing.

14. The system of claim 11, wherein the user input device is configured to allow the user to control a zoom operation during the playback playing.

15. The system of claim 11, wherein the generated graphic animation comprises statistical information related to the real-life sporting event.

16. The system of claim 11, wherein the generated graphic animation comprises statistical information related to an athlete depicted during the playing.

17. The system of claim 11, wherein generating the graphic animation comprises:
obtaining a standard version of play information, wherein the standard version of the play information is information describing the real-life play; and
generating the graphic animation based on the standard version of the play information.

18. The system of claim 11, wherein generating the graphic animation comprises:
obtaining a conventional video of the real-life play; and
generating the graphic animation based on the conventional video.

19. The system of claim 11, wherein playing the graphic animation depicting the real-life play comprises:
receiving a version of play information that is compatible with the user equipment; and
generating the graphic animation based on the received version of the play information.

20. The system of claim 11, wherein the user input device is configured to allow the user to selectively focus on an athlete depicted during at least a portion of the playback playing.

* * * * *